United States Patent [19]

Vecellio

[11] Patent Number: 5,002,309
[45] Date of Patent: Mar. 26, 1991

[54] AUTOMATIC MOBILE

[76] Inventor: Anthony M. Vecellio, 1706 Cedar Hill Dr., Royal Oak, Mich. 48067

[21] Appl. No.: 542,242

[22] Filed: Jun. 22, 1990

Related U.S. Application Data

[63] Continuation of Ser. No. 339,946, Apr. 14, 1989, abandoned, which is a continuation of Ser. No. 29,604, Mar. 24, 1987, abandoned.

[51] Int. Cl.$^5$ .............................................. B62D 21/12
[52] U.S. Cl. .................................... 280/785; 180/312; 180/89.1; 296/197
[58] Field of Search ............. 180/312, 299, 900, 89.1; 280/785; 296/196, 197, 35.3; 29/563, 430, 33 P, 33 K, 711, 791, 822, 823, 824; 198/339.1; 414/222; 901/7.50

[56] References Cited

U.S. PATENT DOCUMENTS

| | | | |
|---|---|---|---|
| 2,083,634 | 6/1937 | Brackett | 118/316 |
| 2,215,668 | 9/1940 | Smith | 118/316 |
| 2,321,982 | 6/1943 | Brackett | 118/316 |
| 2,988,397 | 6/1961 | Brueder | 296/196 |
| 3,691,963 | 9/1972 | Krokos et al. | 105/368 R |
| 3,788,238 | 1/1974 | Bennett | 105/368 R |
| 3,872,983 | 3/1975 | Chapman | 214/38 R |
| 4,311,112 | 1/1982 | Siebeneichen | 118/408 |
| 4,422,685 | 12/1983 | Bonfilio et al. | 296/197 |
| 4,532,148 | 7/1985 | Vecellio | 427/31 |
| 4,539,932 | 9/1985 | Vecellio | 118/697 |
| 4,554,893 | 11/1985 | Vecellio | 123/41.83 |
| 4,594,764 | 6/1986 | Yamamoto | 29/430 |
| 4,667,866 | 5/1987 | Tobita et al. | 29/430 |
| 4,730,870 | 3/1988 | DeRees | 296/197 |
| 4,734,979 | 4/1988 | Sakamoto et al. | 29/430 |

FOREIGN PATENT DOCUMENTS 2207096 1/1989 United Kingdom ................ 296/197

OTHER PUBLICATIONS

"Fast Speeds Won't Cut It in the Auto Industry", Bryan H. Berry, *Iron Age*, Aug. 2, 1982, pp. 53-56.
"Truck to Train Car in Three Minutes," by Angelo B. Henderson, Detroit Free Press, (Jul. 11, 1985).
"Robtic Ride," photograph from Detroit Free Press by Pauline Lubens, (Mar. 7, 1985).
"Auto-Train TM, advertisement and articles," by Herbert Shuldiner.
Ward'Auto World, "Puzzle Cars and Productivity", pp. 28-30, May 1989.
The Detroit News, "GM's Brave New World", pp. 1D-5D, May 13, 1990.

*Primary Examiner*—Kenneth R. Rice
*Attorney, Agent, or Firm*—Harness, Dickey & Pierce

[57] ABSTRACT

Arrangements are disclosed for an automatic mobile and components thereof together with a new mass transit system for said mobile wherein cost reductions, manufacturing simplicity and new methods of travel are obtained primarily through the use of Intregrated Sub Systems, Symmetry, Remanufacturability, Transfusion Coatings, and an Automatic Transport Mode thereby resulting in elimination of large automotive assembly plants and the haulaway delivery industry with subsequent opening-up of competition which will allow new automotive industries to form with very minimal investments.

16 Claims, 33 Drawing Sheets

AUTOMATIC MOBILE

This is a continuation of U.S. patent application Ser. No. 339,946, filed Apr. 14, 1989 which is a continuation of 029,604 filed Mar. 24, 1987 both now abandoned.

TECHNICAL FIELD

Figure 1:
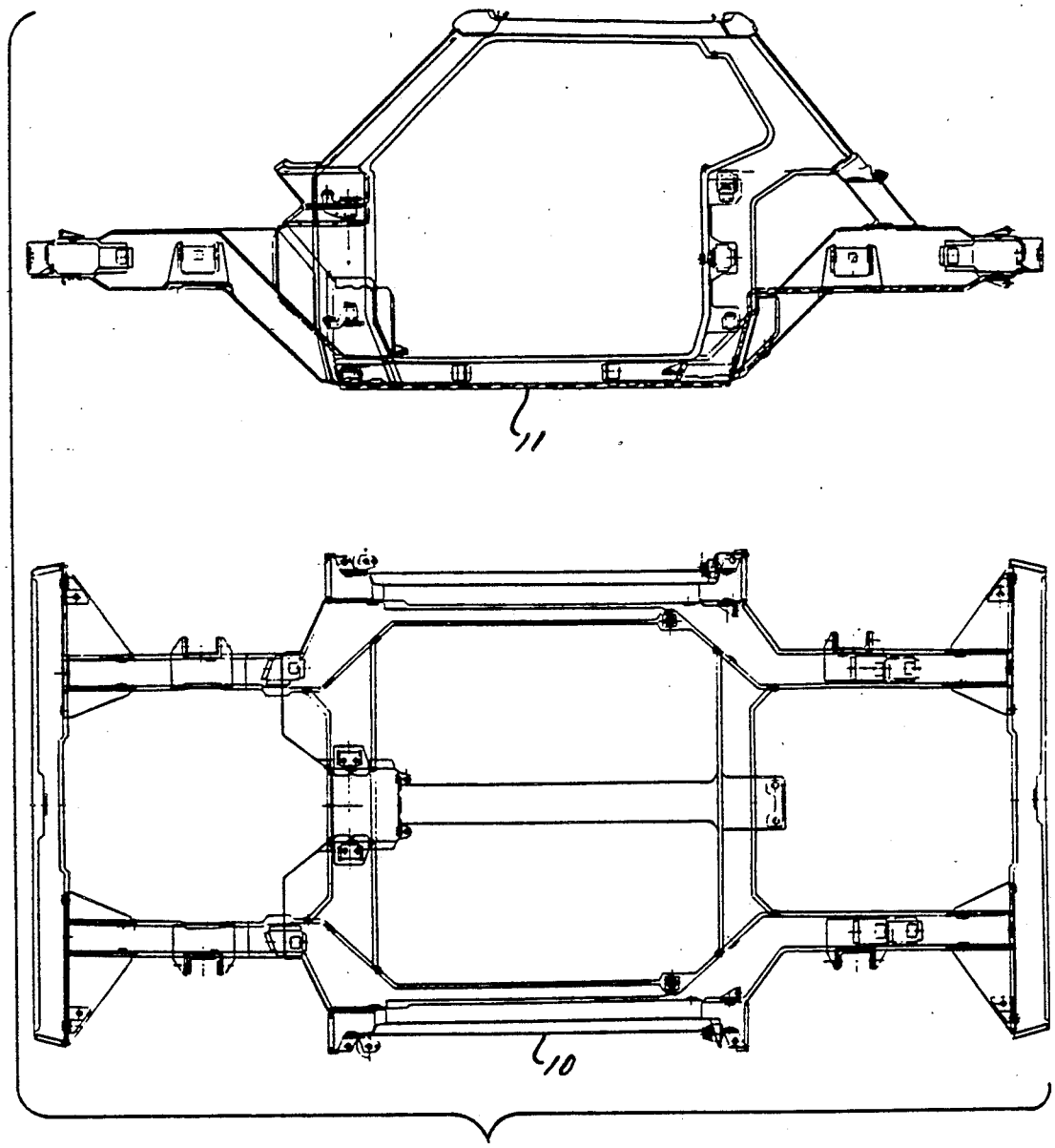
FIGS. 1 through 15 are individual views of the 15 Integrated Sub System "ISS" units of the invention.

The present invention relates to automatic mobiles more commonly known as automobiles and it includes vehicles such as cars, vans, and trucks. In particular, the present invention relates to a new type of vehicle design which drastically enhances the manufacturing processes involved with the production of said automobiles.

The finished product of the present invention looks, behaves, and contains state of the art components similar to other standard vehicles currently on the road.

BACKGROUND

At present the manufacture and design of automobiles is generally considered by experts in the field to be in a highly refined state and of a finalized nature: Status Quo. After millions of vehicles produced through the design efforts of thousands of engineers over many years, the experts believe there is not much left that can be done to the state of the art to improve the optimized process of creating vehicles. This is evidenced by the very low response to the U.S. Governments challenge to Detroit automakers and top industry officials to turn to new approaches in the quest to reinvent the automobile. The request was made on Dec. 5, 1978 by Transportation Secretary Brock Adams who sharply criticized what he called a lack of innovation by U.S. car companies. Except for styling, automotive companies, their manufacturing facilities and products, both domestic and foreign, are pretty much carbon copies of each other including those of the future displayed at the most recent auto shows. They exhibit none of the claims of the present invention making it therefore not obvious to persons skilled in the art. Letters Patent are petitioned to be granted even though they be for something already in existance because they exhibit great improvement over prior art with enormous benefits that will be subsequently described. Precedence for a patent issued on an existing mechanism and a better way to build it can be shown in U.S. Pat. No. 4,554,893 for an internal combustion engine. The present invention contains sufficient claims of originality never used before and encompassing the entire enity so as to qualify as a reinvention of the entire automobile as it is commonly and universally known today. While the current automobile has been a slow and methodical evolutionary development over many years, the present invention is a revolutionary one incorporating drastic and radical departures which bespeak of invention over prior art and over the Status Quo of regular automobiles.

PRECEDENCE

Precedence for invention claims known as Symmetry, Integrated Sub System, and Remanufacturability to be subsequently described for the present invention can be found in U.S. Pat. No. 4,554,893 wherein they relate to an internal combustion engine.

The Symmetry feature of U.S. Pat. No. 4,554,893 relates to the stamping of engine parts without mirror imaging to reduce the number of parts required.

The Intergrated Sub System feature of U.S. Pat. No. 4,554,893 relates to the combining of accessories into a single package as a separate entity unto itself.

The Remanufacturability feature of U.S. Pat. No. 4,554,893 relates to simplified low cost discarging, replacement, and/or repairing of engine components.

BRIEF SUMMARY OF THE INVENTION:

The present invention embodies automobile production with new principles of design philosophy including Symmetry, Integrated Sub Systems, Remanufacturability, Transfusion Coatings, and Automatic Transport Mode.

The Integrated Sub System "ISS" principle takes the approximate 15,000 parts of an automobile and consolidates them into 15 "ISS" units. This feature eliminates the need for very large state of the art assembly plants as well as the car haulaway industry. Vehicles can be assembled in a stationary position in small low volume output studios for immediate customer pickup.

The Symmetry principle eliminates mirror imaging thereby drastically reducing the number of different parts required as well as the machines and tools to produce them.

The Remanufacturability principle is a derivative of the "ISS" feature where vehicle rebuilding, repair and resale becomes a practical low cost reality with easy replacement of "ISS" units. The "ISS" principal adds equity to the value of a vehicle which no longer needs to be "totaled" if it is accidentally damaged; which no longer has to be scraped if an engine wears out; and which no longer has to be resold "as is" because remanufacturing rewarranty is too costly and impractical. In addition, easy remanufacturability opens up an entire new used-car market.

The Transfusion Coatings principle allows power injected materials to be applied to all internal box section superstructure surfaces for maximum corrosion protection to maintain structural integrity, a process not previously possible. Finally, the automotive Transport mode principle provides a new method of mass transit that conveys the driver and vehicle stacked sideways on railroad cars and trucks in a practical and high volume fashion, thereby providing an abundance of leisure time without vehicle control as well as greatly reduced energy transportation and traveling costs. These and other features and advantages of the invention will be more fully understood from the following description of certain preferred embodiments taken together with the accompanying drawings.

DETAILED DESCRIPTION OF THE PRESENT INVENTION

Description of the Integrated Sub System

The established modern method of assembling vehicles requires the shipment of thousands of parts to an assembly plant for methodical and systematic installation into a vehicle as it moves along on approximately a 6 mile long conveyor system. The finished vehicle is one large assembly with all its components interdependent upon each other. The conveyor system has a very low efficiency of only 30 to 35 percent. It forces a vehicle to be designed to accomodate high speed very short direct labor operations lasting only 30 seconds or so. An operator cannot fix something because there is not enough time. Parts must be added even if they are defective so as not to hold up subsequent operations. There can be no testing of the components as they relate to each other until the entire vehicle is completed. Subsequent testing prior to shipment is conducted on a "roll test" machine for approximately one minute. The vehicles are then shipped to the sales outlets via a haulaway industry using thousands of trucks, drivers and trains.

The present invention using Integrated Sub Systems eliminates the multi billion dollar assembly plant and the haulaway industry by allowing components to be assembled into a vehicle in a stationary position in small low volume output studios for immediate customer pickup.

The present invention optimizes the approximate 15,000 parts of an automobile into 15 units as follows:
FIG. 1 Superstructure space frame
FIG. 2 Outer skins
FIG. 3 Power train
FIG. 4 Rear suspension
FIG. 5 Center console and seats
FIG. 6 Air conditioning and heater system
FIG. 7 Spare tire and tools
FIG. 8 Steer console
FIG. 9 Radio
FIG. 10 Steer wheel and controls
FIG. 11 Self contained air bag
FIG. 12 Front and rear facia with lamps
FIG. 13 Door assembly
FIG. 14 Roof
FIG. 15 Wiper system and air plenum Each "ISS" units internal design is patentable unto itself by its own manufacturer. It can be of any design by any manufacturer so long as it fits and contains all necessary components as dictated by overall vehicle requirements. The "ISS" unit has the potential of greatly optimizing design, manufacture and cost by providing flexibility and competitiveness. "ISS" units are used to produce assembled vehicles in a stationary position in studios. "ISS" manufacturers eliminate the expensive and unnecessary intermediate steps of the assembly plant and haulaway industry by shipping directly to the studio. A typical studio is shown in FIG. 16. An end elevation view 1 and a plan view 2 of the studio outlines facilities for producing 10 vehicles per day. Time studies indicate that direct labor to assemble one vehicle in 8 hours with 15 "ISS" units is 2 operators. This puts the capacity of a single studio working 50 weeks with 1 shift at 2,500 vehicles per year. Studio assembly at Americas 20,000 dealerships would provide an annual production of 50 million vehicles. This is more than enough capacity to shut down every assembly plant in North America. The studio shown is 200 feet long by 40 feet wide. If the vehicles 5 are turned sideways the studio size is reduced to 120 feet long by 50 feet wide. Many other variations are possible. In addition to existing dealerships there are countless warehouses, supermarkets, bowling alleys, office buildings, and other such places going unused where practically anybody can go into the automotive business with a minimum investment thereby opening up competition.

Additional details of the studio include exterior cargo containers 3 with vehicle "ISS" units; overhead bridge cranes 4 to move "ISS" units from cargo containers to assembly area; vehicle 5 in position during assembly; operators tools 6; customer lounge area 7; parts storage 8; and office facilities 9 including a lobby, product display and rest rooms. The cargo containers 3 have enough "ISS" units for a production run of 2 weeks to 19 weeks. Production work is directly out of the cargo containers to the vehicle, thereby saving floor space, property taxes, and double handling with "JIT" Just-In-Time manufacturing techniques.

Production of "ISS" units is carried out by the regular parts manufacturers who have been doing it all along. But with the present invention existing manufacturers as well as new ones ship "ISS" units to the assembly studios instead of the normal assembly plants.

The concept of "ISS" units can also be viewed as 100 percent outsourcing whereby a manufacturer of automobiles may assemble, market, and sell without actually building a single component. This of course opens up the market to great competition with a minimum investment.

An additional benefit of the "ISS" method of manufacturing vehicles is lower insurance costs because the vehicle becomes easier to repair by salvaging "ISS" units for reuse without having to "total" a vehicle after an accident.

Manufacturers expensive product liability insurance is also greatly reduced with "ISS" units that allow for easy replacement.

Remanufacturability, which will subsequently be described, will provide additional benefits for the use of "ISS" units. Detailed explanation of each "ISS" unit is as follows. Owing to the possibility of hundreds of different internal variations of each unit only a general description of each one is presented. All parts of a vehicle are accounted for because they all fit into one or the other of the 15 "ISS" units. Each "ISS" unit is complete with necessary bolt-on brackets for connections to the superstructure space frame and with proper wiring and tubing for interconnections with each other. The "ISS" superstructure space frame is shown in FIG. 1 with plan view 10 and side view 11. It contains all necessary brackets for connection thereto of other "ISS" units including necessary glass.

Figure 2:
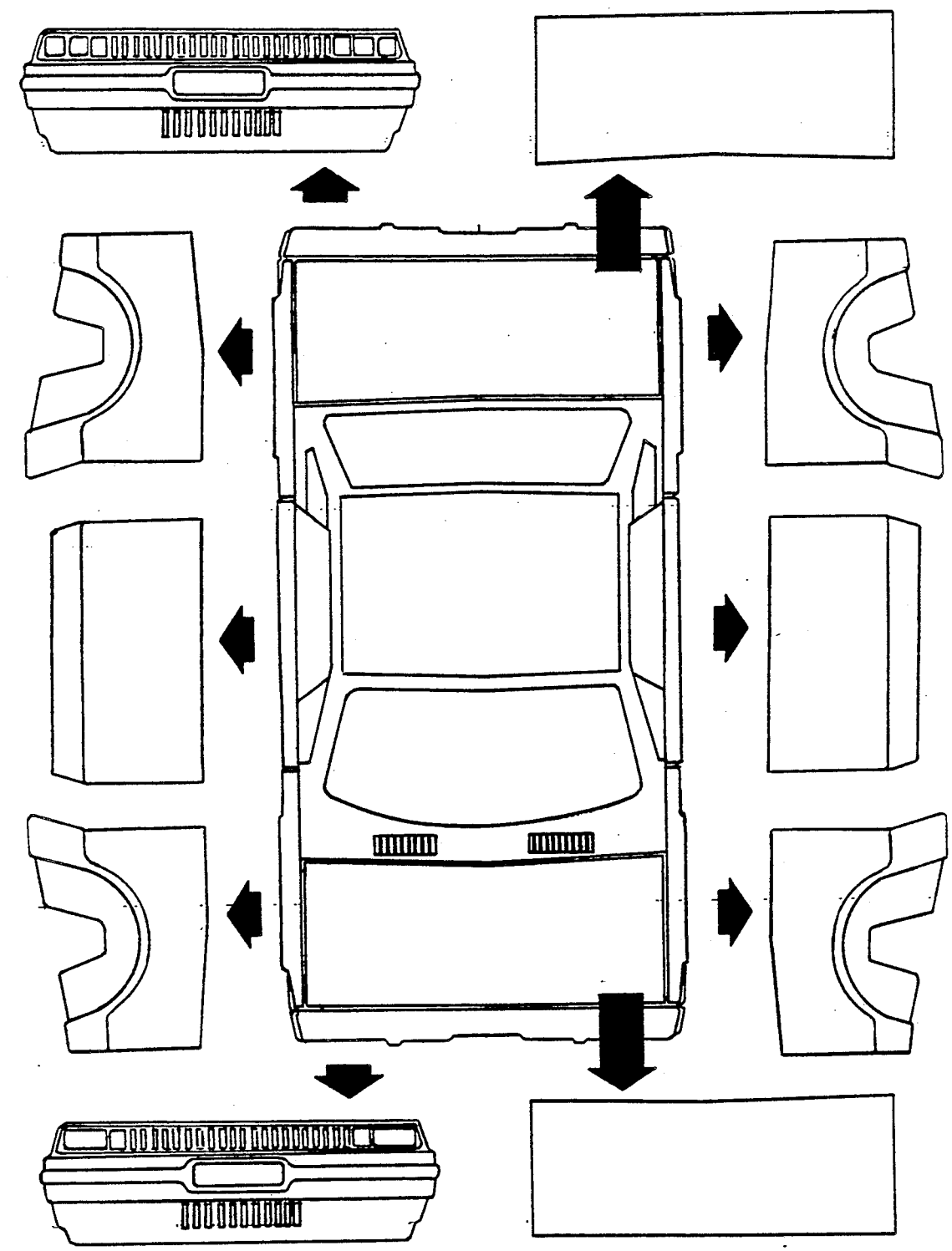

The "ISS" outer skins are shown in FIG. 2. They are attached in standard bolt-on fashion after the vehicle assembly has been completed. Note the symmetry between the various skins which will be subsequently described.

Figure 3:
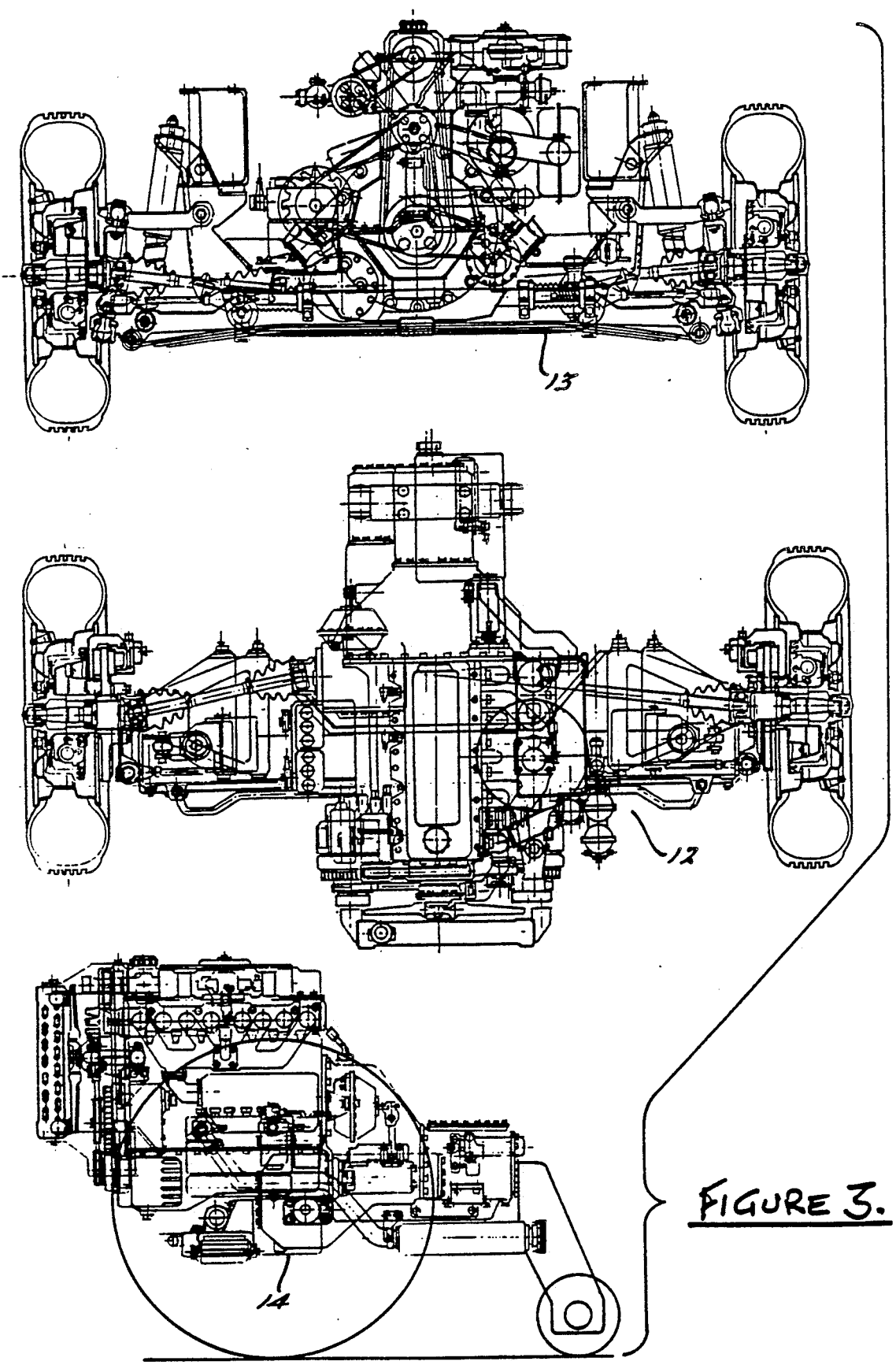

The "ISS" power train is shown in FIG. 3 with plan view 12, front view 13, and side view 14. The power train system includes, but is not limited to the engine, transmission, wheels, steering mechanism, suspension, brakes, exhaust system, cooling apparatus, carbureation, battery, distributor, and electrical controls. It is a self contained system fully operable even without the rest of the automobile.

Figure 4:
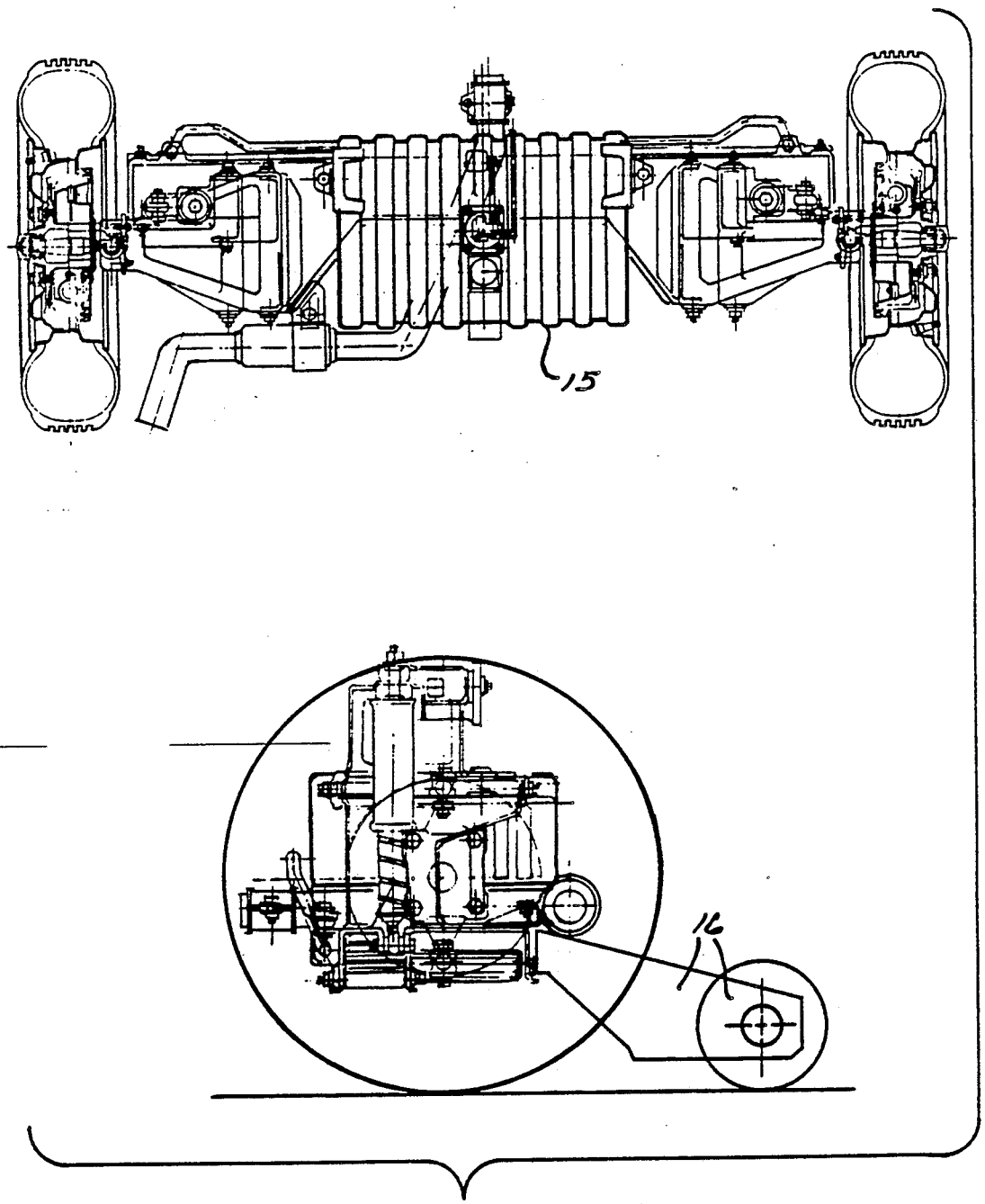

The "ISS" rear suspension is shown in FIG. 4 as plan view 15. It contains the gas tank assembly and rear portion of the exhaust system. It is identical to the front suspension with addition or deletion of leaf springs to suit load conditions of specific vehicles. A removable fixture 16 containing a wheel provides stability during manufacture and studio assembly.

Figure 5:
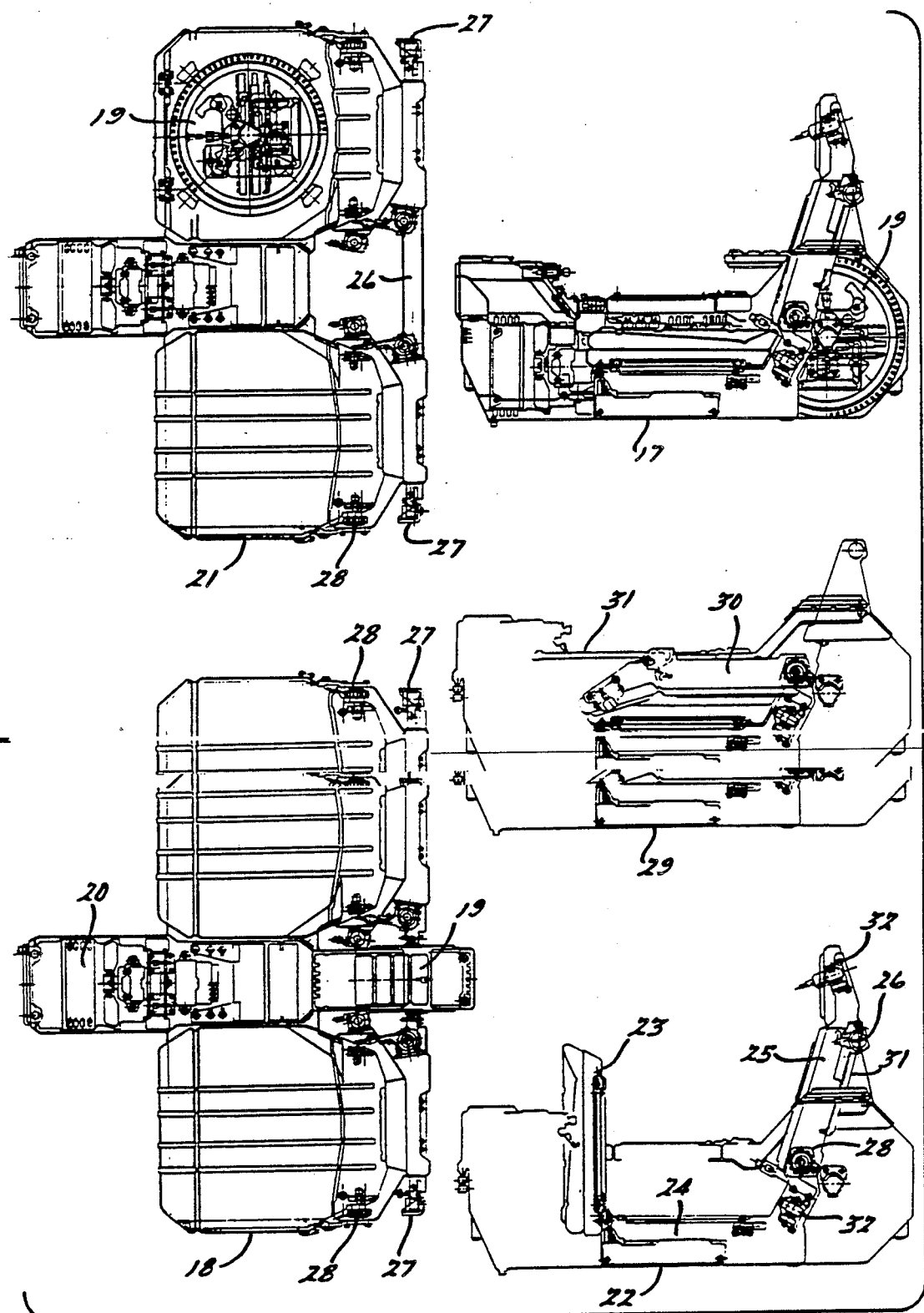

The "ISS" center console and seats is shown in FIG. 5, side view 17 illustrates the unit in normal position for driving. Plan view 18 illustrates the spare tire assembly 19 in the center console together with the heating system "ISS" unit 20. Plan view 21 illustrates the spare tire "ISS" unit 19 under the passenger seat. Side view 22 illustrates seat bottom 23 in vertical position for compartment 24 access. It also shows seat back 25 in normal position and locked to cross member 26 which in turn is locked to superstructure at point 27 for high structural strength. Seat back position is adjustable by pivoting slightly on cross member 26 by adjustment 28. Side view 29 illustrates the seat back 30 in lowered position for shipping purposes. The back 31 may be flipped over for additional horizontal flat storage space. Seat belt retractors and latches 32 are positioned as required. Note that seats do not move for adjustment thereby offering maximum structural strength.

Figure 6:
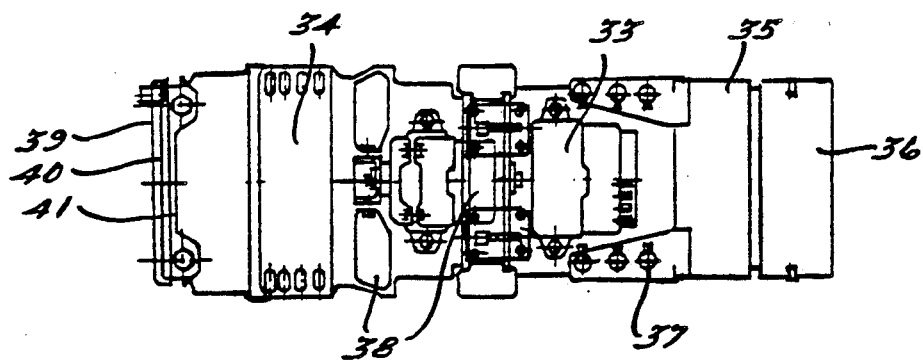
Figure 7:
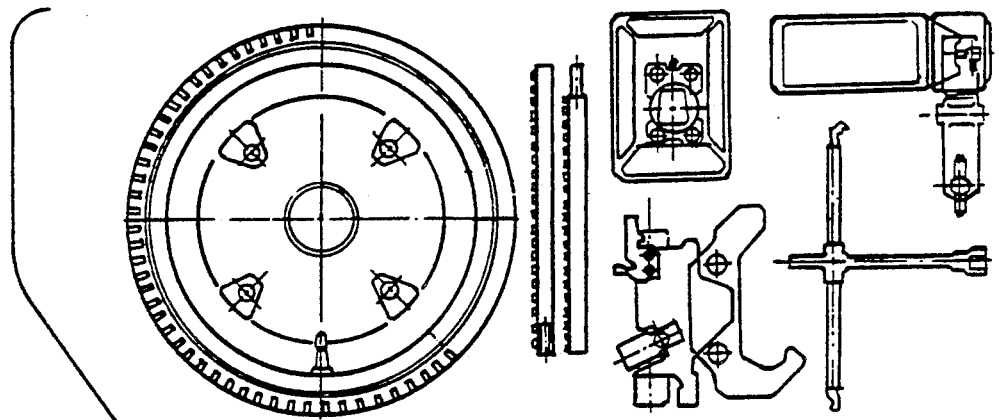
Figure 7:
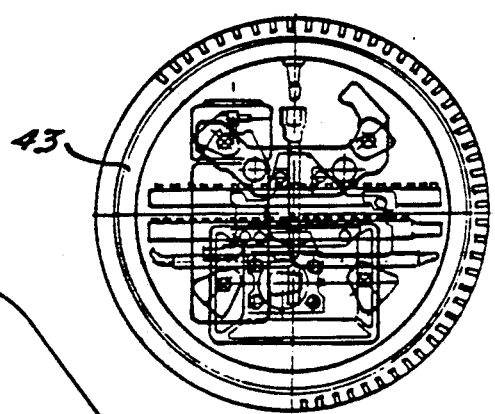

The air conditioning and heater "ISS" unit is shown in FIG. 6. The air conditioner for cooling uses a hermetically sealed refrigeration system 33 electrically operated at constant speed with necessary condensor 34 and evaporator 35 coils, expansion valve, and controls. The unit also contains a heating coil 36 which operates with engine coolant water. Electric finned strip heaters 37 add heat when the engine is off during automatic transport mode to be subsequently described. Common shaft fans 38 receive and discharge air via main plenum 39, via defroster discharge to windows 40, and via direct discharge to vehicle interior 41. A sepatate engine mounted alternator provides power to run the entire unit. The spare tire and tools "ISS" unit is shown in FIG. 7. Separate components shown grouped in 42 include the tire, rim, inflator, jack, base plate, vertical lift posts, and tire-iron. The "ISS" unit 43 shows all components stowed inside the rim.

Figure 8:
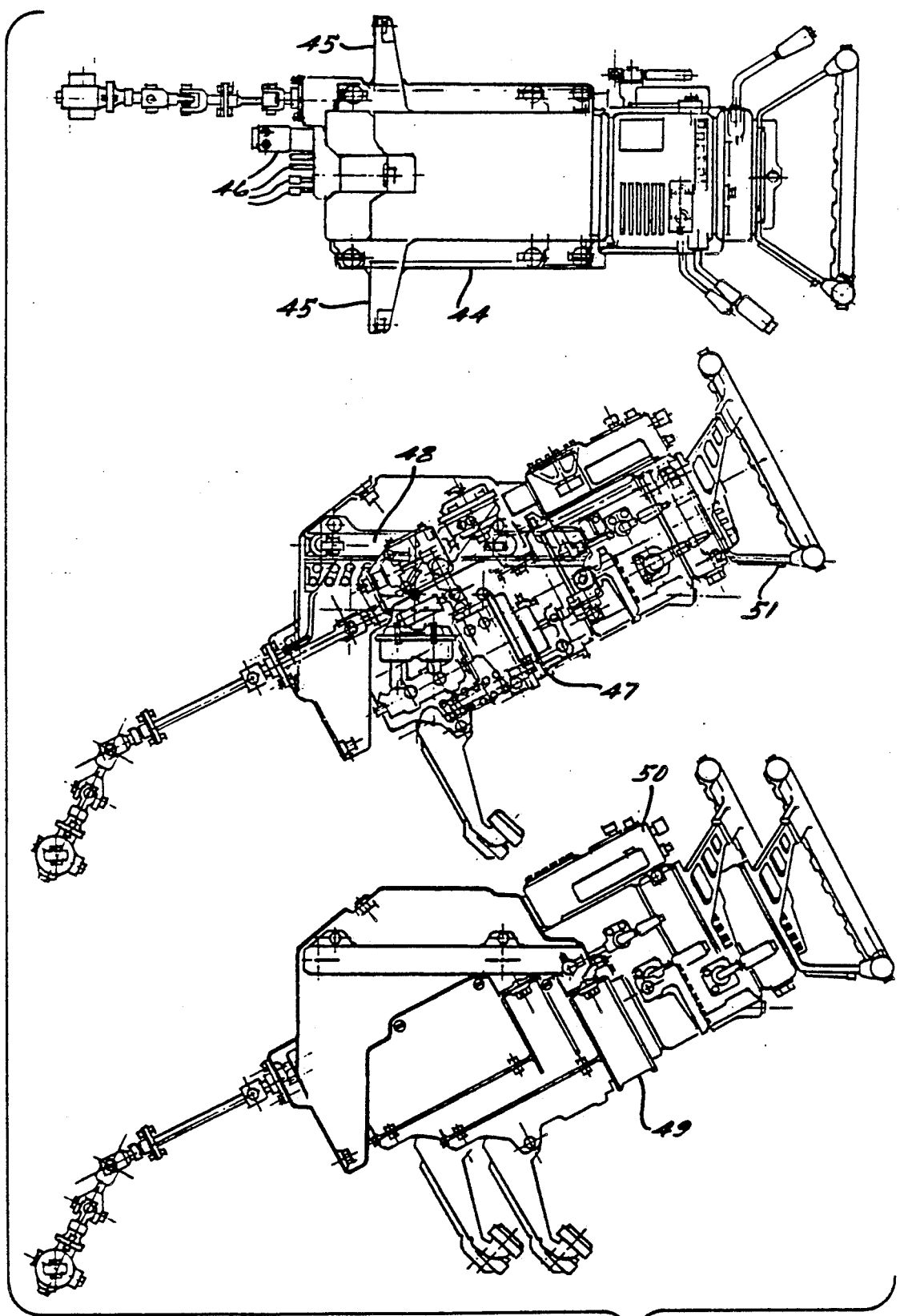

The steer console "ISS" unit is shown in FIG. 8. Top view 44 illustrates firewall mounting flanges 45 and various mechanical and electrical control points 46 to the engine. Side view 47 illustrates in particular the slide track 48 for adjusting the entire steer console as shown in side view 49. This adjustment takes the place of normal seat adjustment which stationary seats do not provide. A telescoping steer rod and looped flexible hoses, cables, and electric wiring accomodate motion of the steer console. Other "ISS" units contained in the steer console include the radio 50, self contained air bag, and steering wheel 51.

Figure 9:
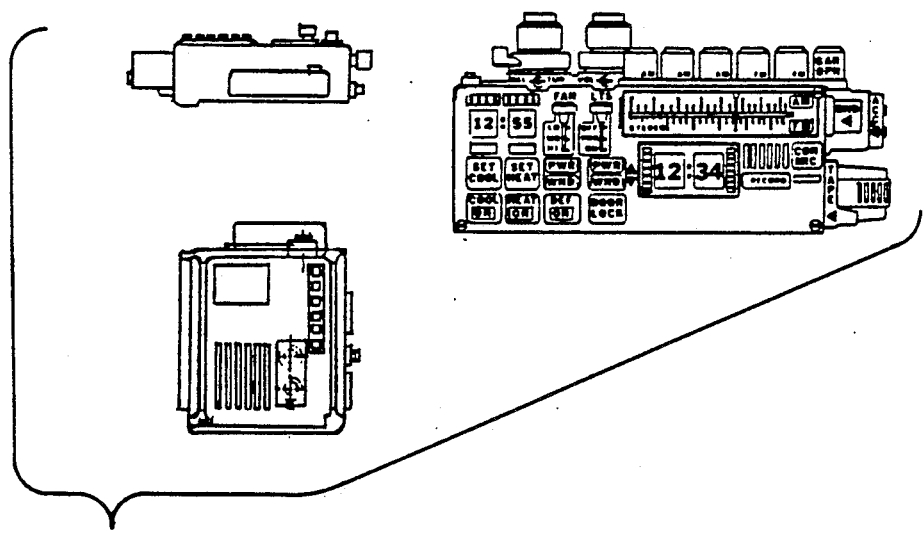
Figure 10:
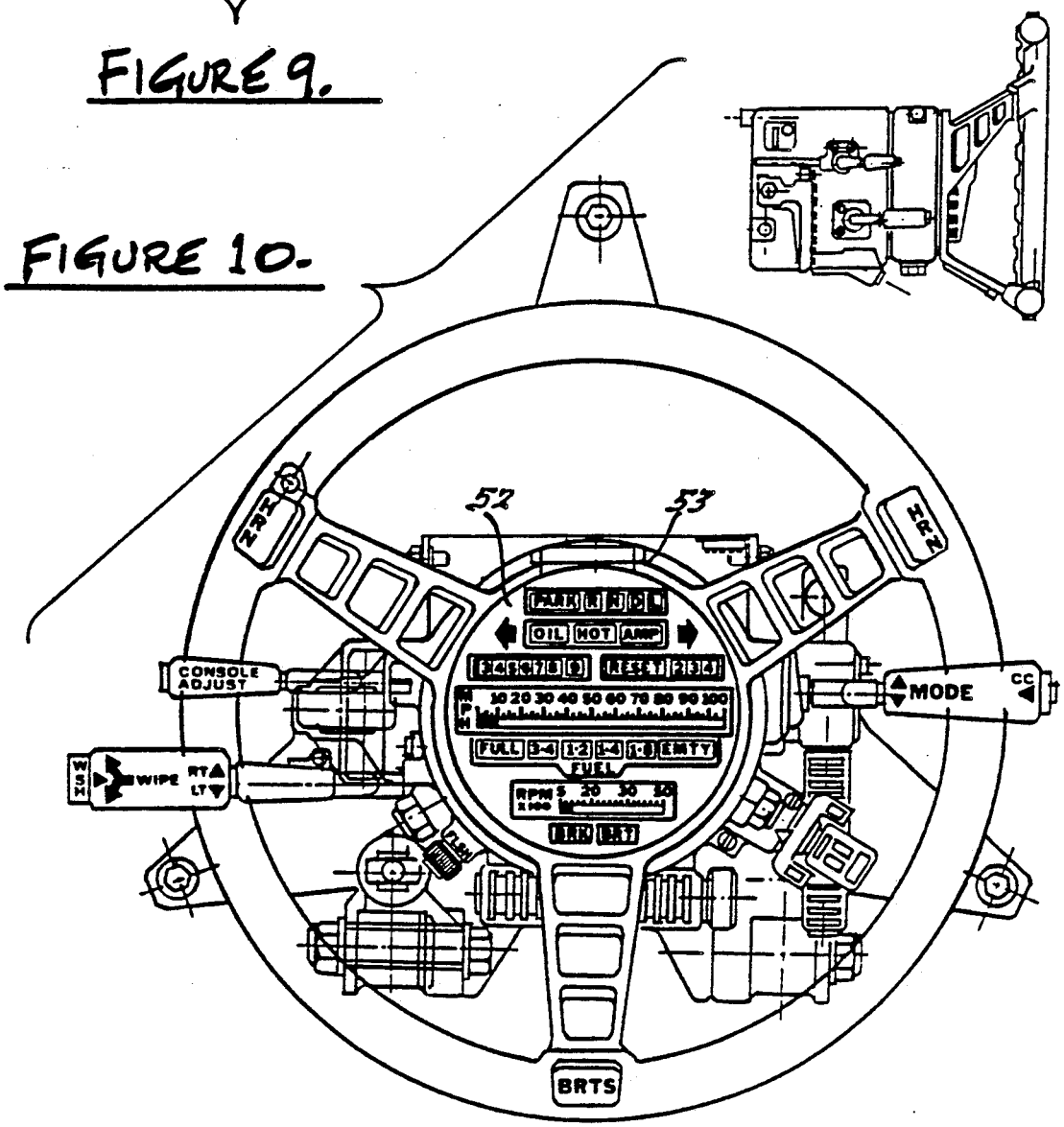

The radio "ISS" unit is shown in FIG. 9. The entire unit is self contained including speakers and requires only a 12 volt power connection. It is mounted on top of the steering wheel. The steering wheel "ISS" unit is shown in FIG. 10. It mounts on steer console and its hollow center can accept a self contained air bag. Its vehicle performance display dial 52 is spring loaded hinged at 53 so that it can be shoved out of the way by the inflating air bag. The steering wheel contains ignition key, levers for braking, turn signals, shifting and cruise control.

Figure 11:
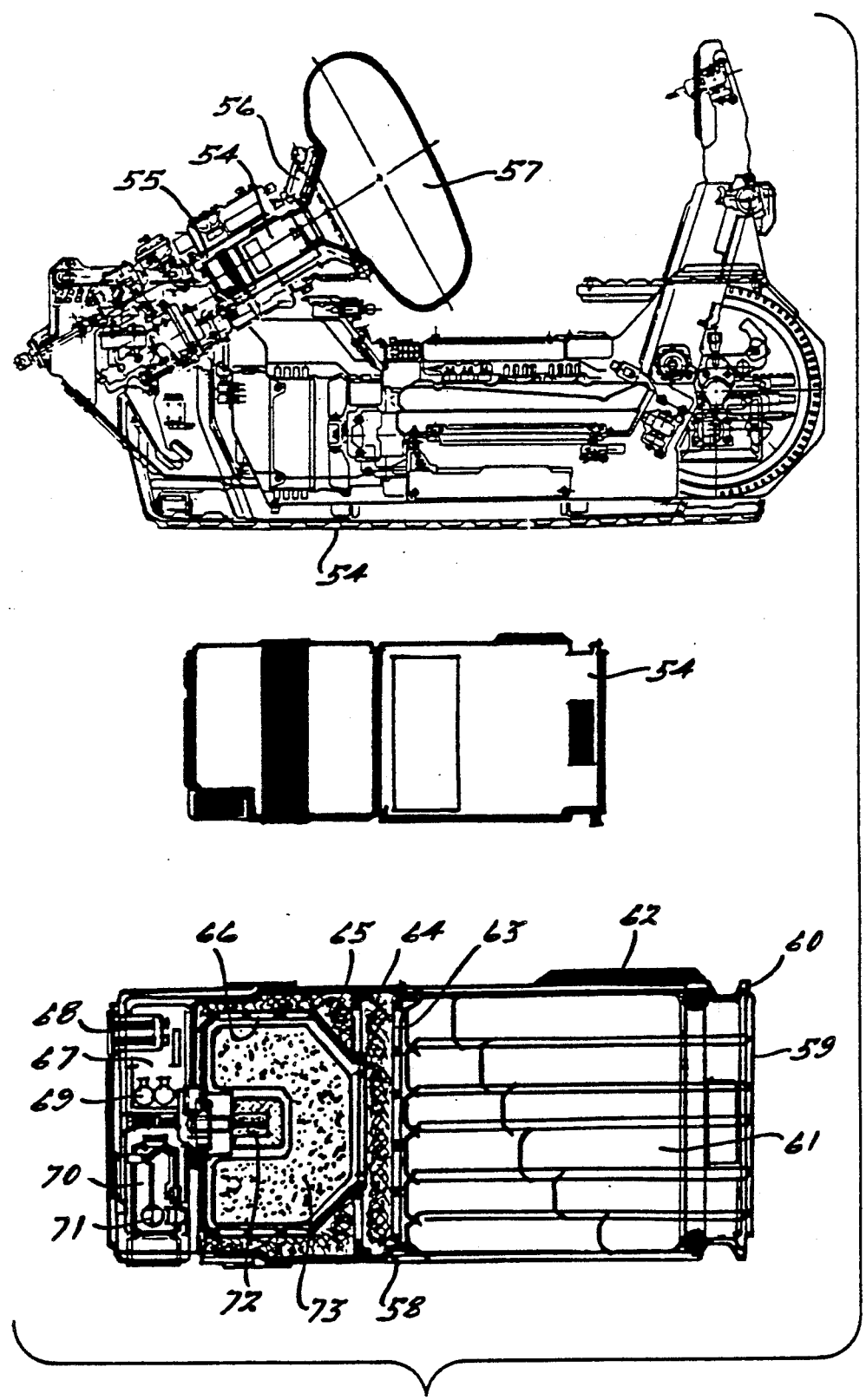
Figure 12:
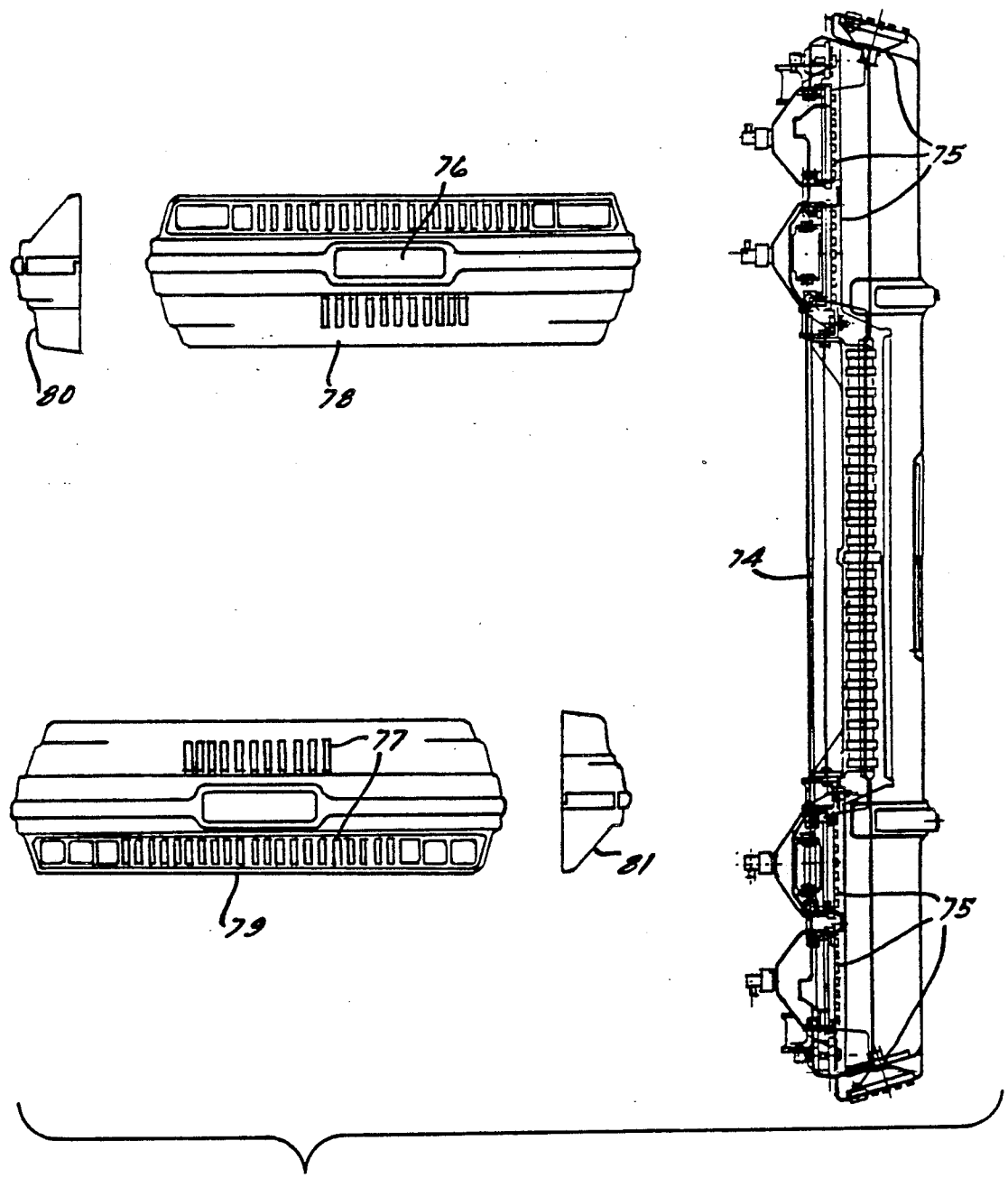
Figure 13:
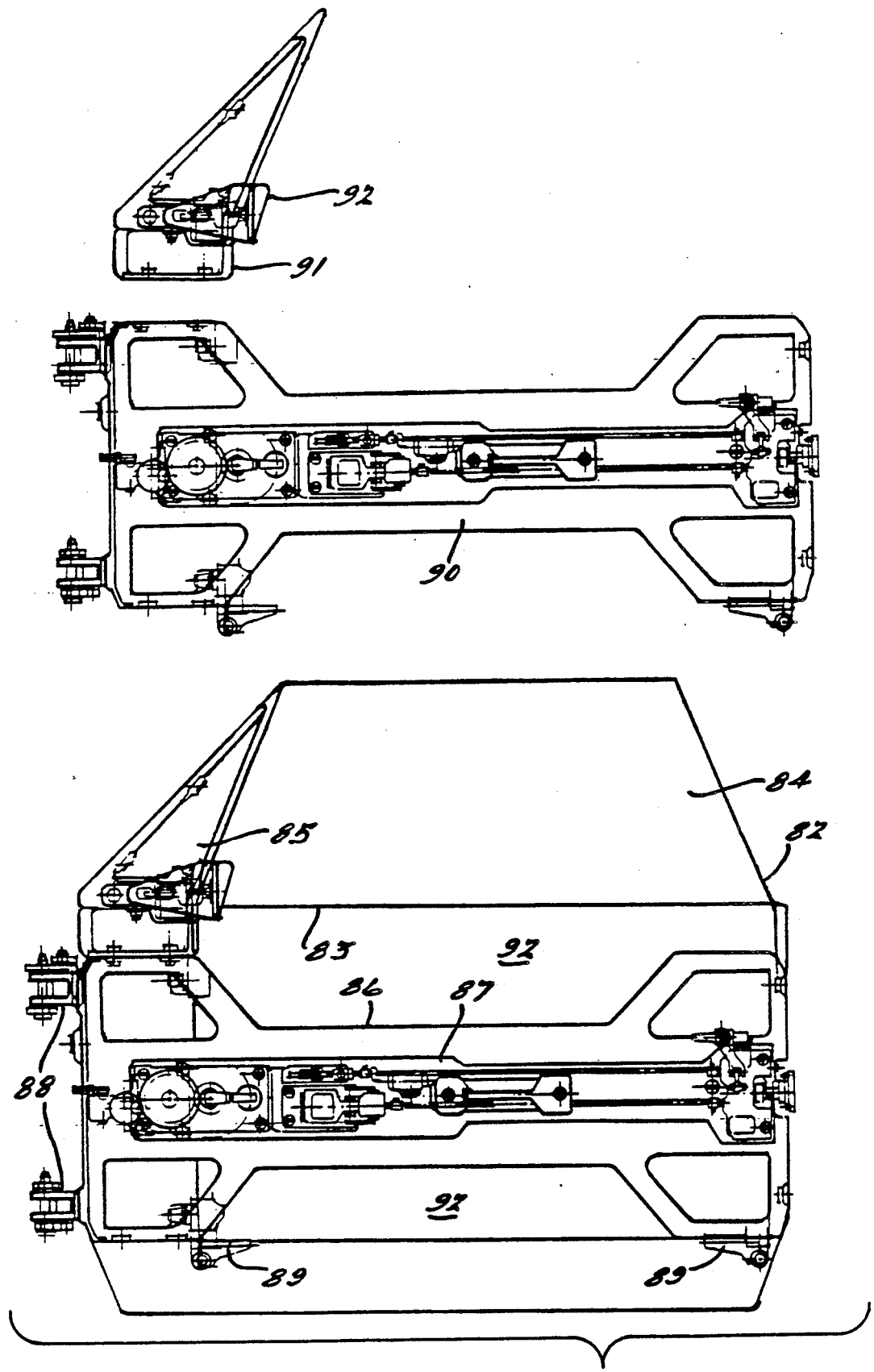

The self contained air bag "ISS" unit is shown in FIG. 11. Side view 54 illustrates the cannister 54 nestled inside hollow steer console 55 with spring loaded hinged display dial 56 pushed out of the way by inflated air bag 57. The interior of the self contained air bag is shown in view 58. Its components are as follows: protective membrane 59, retention flange 60, folded air bag 61, location flange 62, combustor ports 63, filter 64, slag chamber and heat sink 65, diffuser 66, diagnostic package and electronic control 67, external connector for testing 68, alarm horn with automatic actuation one year after battery is installed 69, nine volt battery 70; pendulum detector 71, squib and booster 72, and pyrotechnic propellant gas generator 73. The front and rear facia with lamps "ISS" unit is shown in FIG. 12. Plan view 74 illustrates both the front and rear facias which are interchangeable. All necessary lamps 75 for parking, turning, heading, braking, and reversing are also interchangeable. The facia also contains flip down license plate mount 76 for gas tank access and necessary grille work 77 for air flow. End views 78 and 79 and side views 80 and 81 illustrate the interchangeability features for styling purposes. Corresponding views are identical but rotated 180 degrees with lamps inserted accordingly. The door assembly "ISS" unit is shown in FIG. 13. The fully assembled door is illustrated in side view 82 and in complete with outer skin 83, glass 84, side vent 85, door safety beam 86, door mechanisms 87, hinges 88, and glass retainers 89. Symmetry features to be subsequently described are present in all parts so that the right door is also the left door. The entire door beam assembly 90 need only be rotated 180 degrees for use on the opposite side. Side vent 91 is also designed for use on either side with connection at top or bottom of beam 86. Mirror 92 is designed for attachment to either side of vent 91. Glass retainers 89 are also designed for attachment to top or bottom of beam 86. Door mechanism 87 contains all standard features such as lock, regulators, cranks, arm rest, and power actuators. Interior panels 92 are also interchangeable in right and left side doors.

Figure 14:
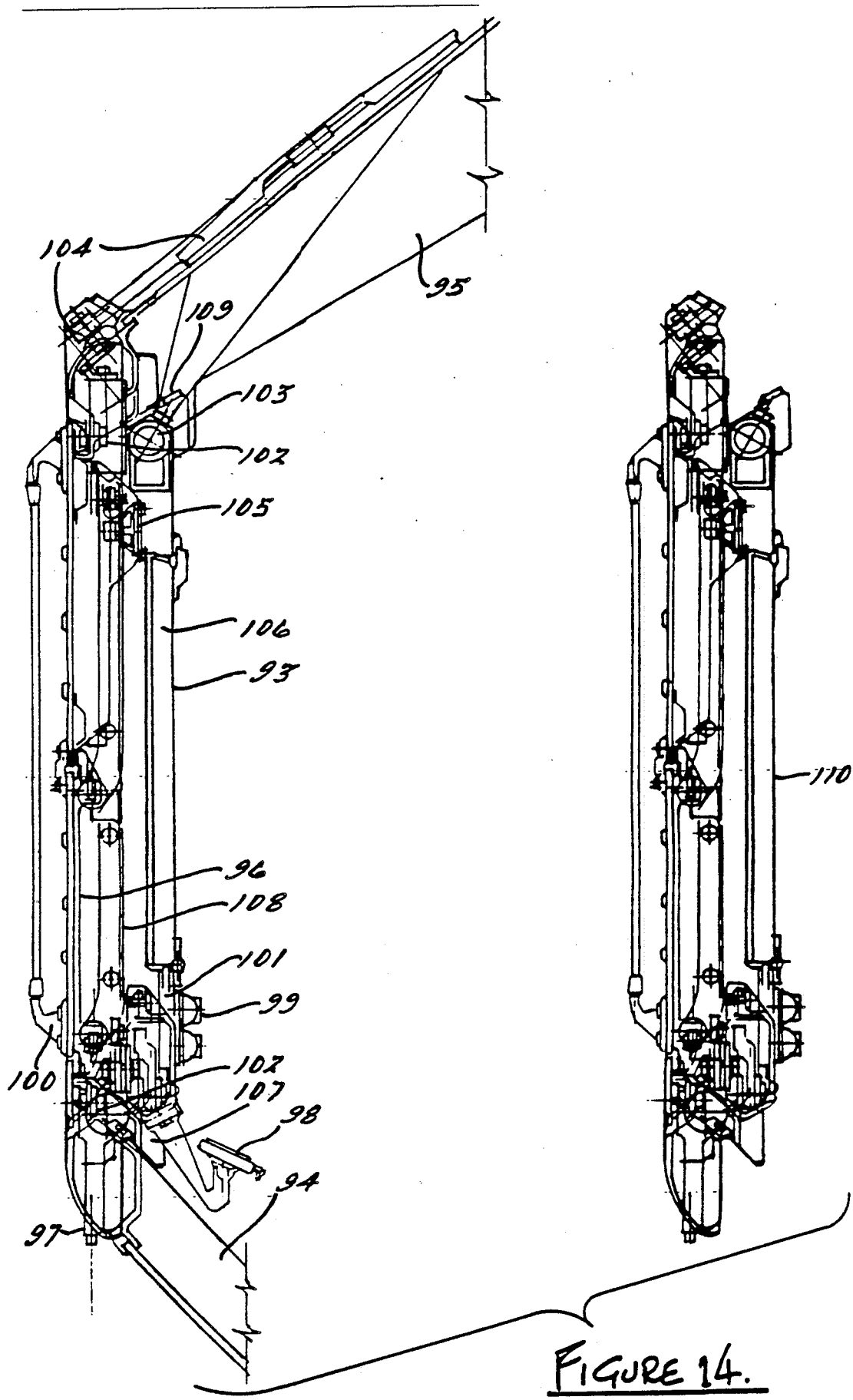

The roof "ISS" unit is shown in FIG. 14. Side view 93 illustrates the location of the roof with relationship to the front pillar post 94 and the rear sail panel 95. The unit contains motorized sun panel 96, radio antenna 97, rear view mirror 98, dome lamps 99, luggage rack 100, sun visor 101, bolt down points to superstructure 102, rear defroster 103, rear window wiper 104, radio speakers 105, storage compartment 106, radar detector 107, rain gutters 108, and cyclops light 109. Side view 110 illustrates the roof "ISS" unit with mirror removed for efficient shipping purposes and with wiper blade retracted.

Figure 15:
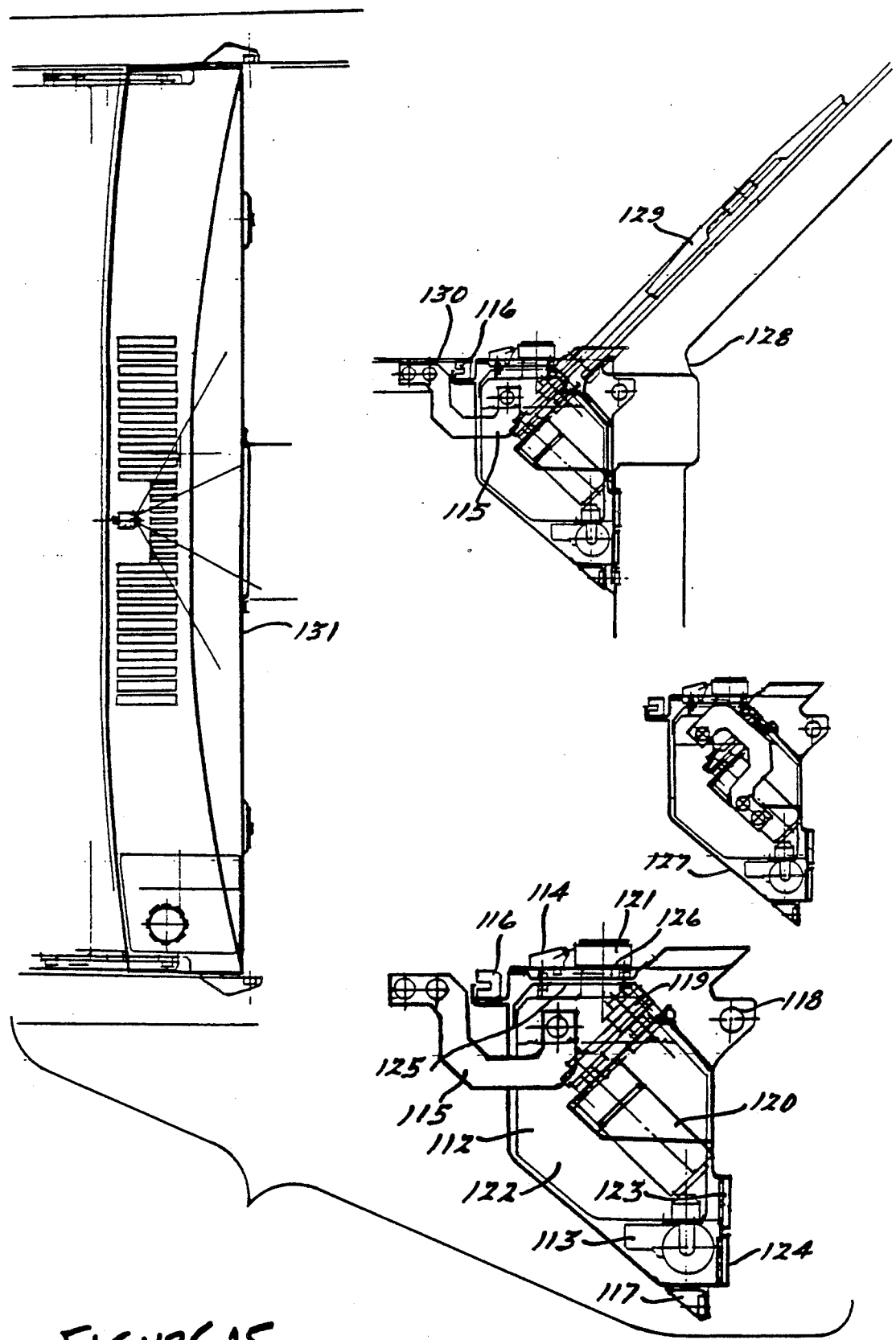
Figure 16:
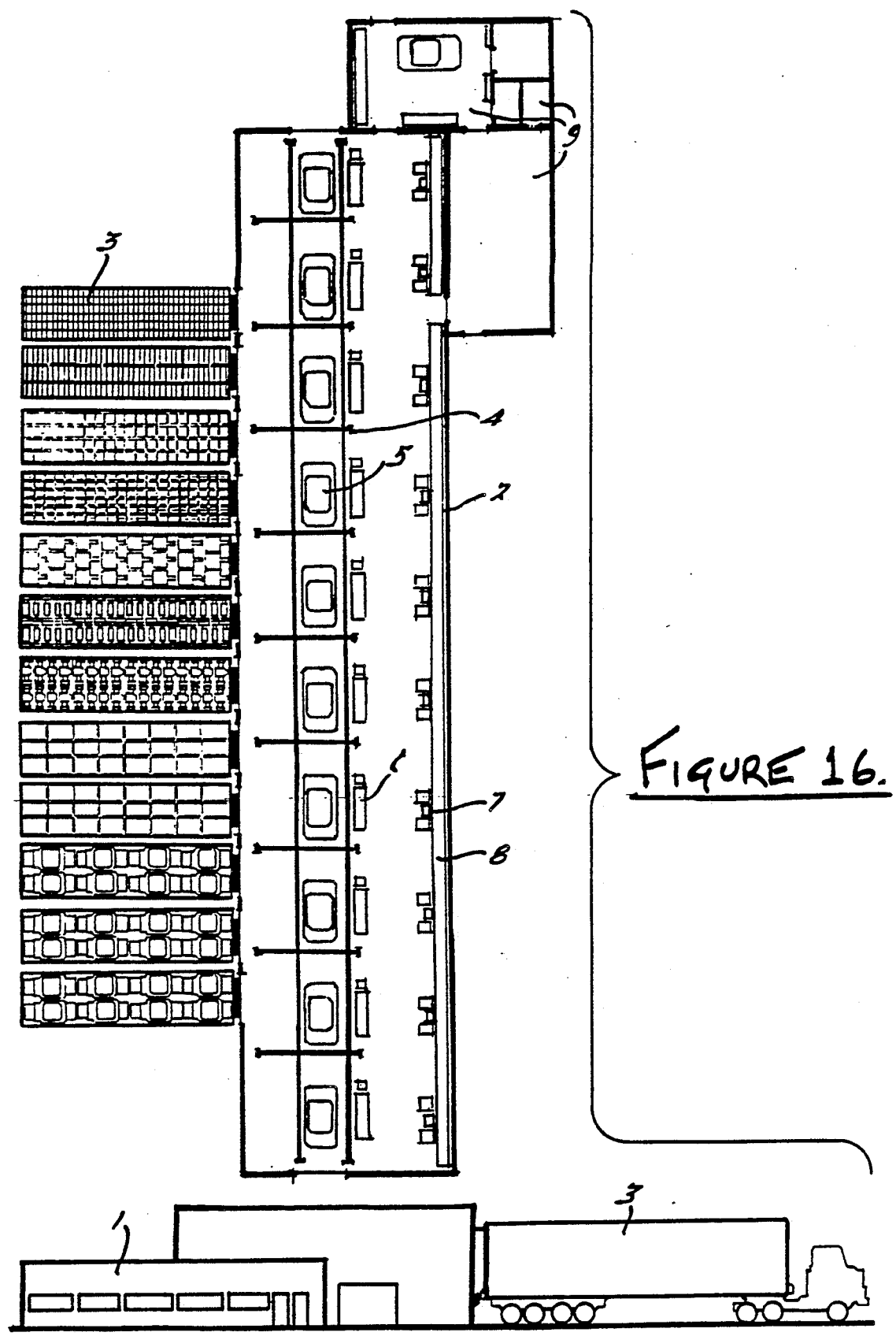
FIG. 16 illustrates the studio where vehicles are assembled in a stationary position.

The wiper system and air plenum "ISS" unit is shown in FIG. 15. Side view 111 illustrates the washer fluid container 112, fluid pump 113, spray nozzle 114, hood hinge 115, sealing gasket 116, bolt down point to firewall 117, bolt down point to pillar post 118, retracted blades 119, wiper motor 120, fluid fill cap 121, main plenum 122, air supply to center console 123, air discharge 124, screen 125, and removeable louvered top skin 126. Side view 127 shows the hood hinge rotated for shipping. Side view 128 shows wipers 129 extended and hood 130 connected to hinge 115 and sealing gasket 116. Plan view is shown as 131.

Figure 17:
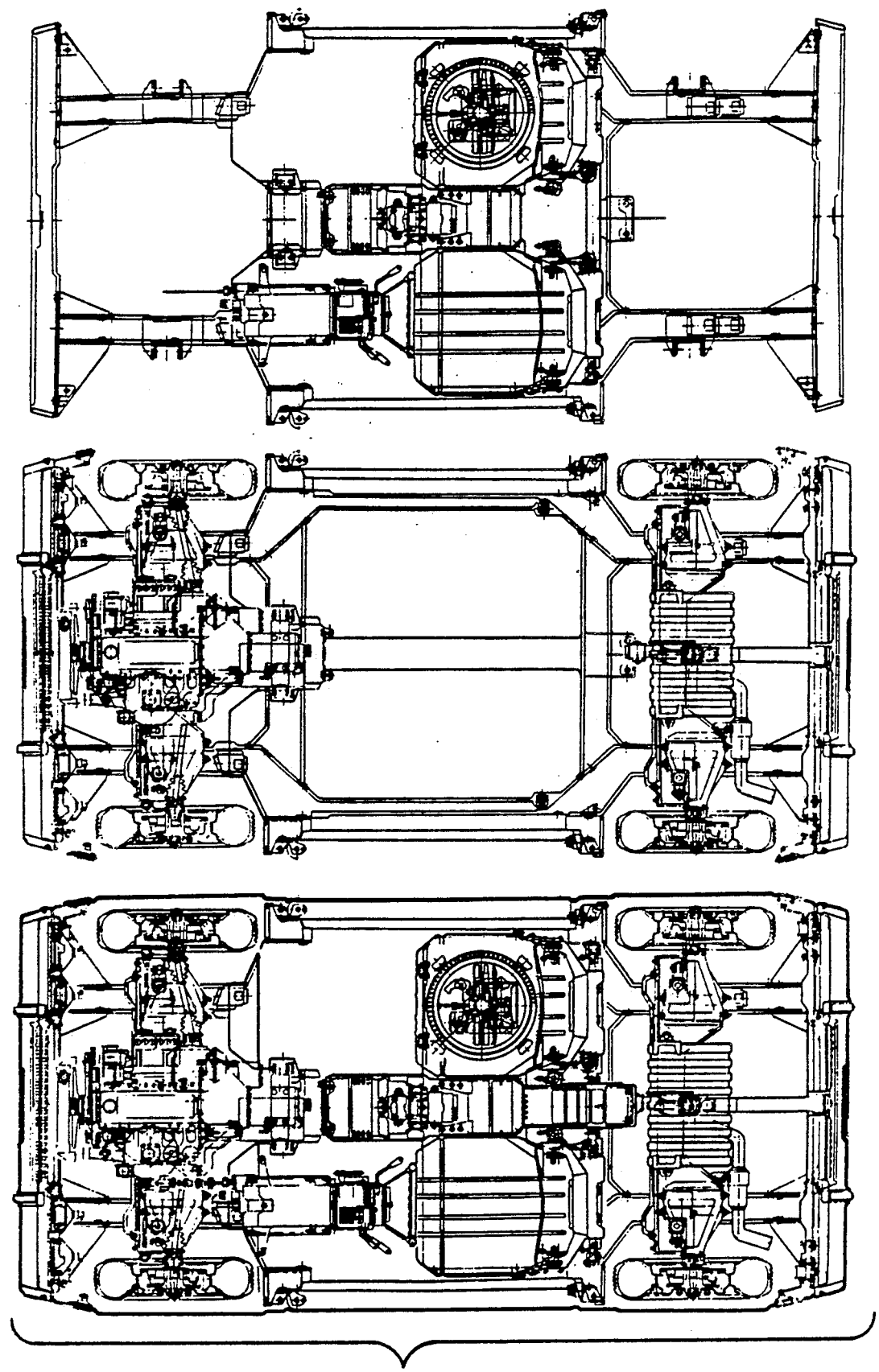
FIGS. 17 and 18 are plan views and side views of various stages of vehicle assembly in the studio.
Figure 18:
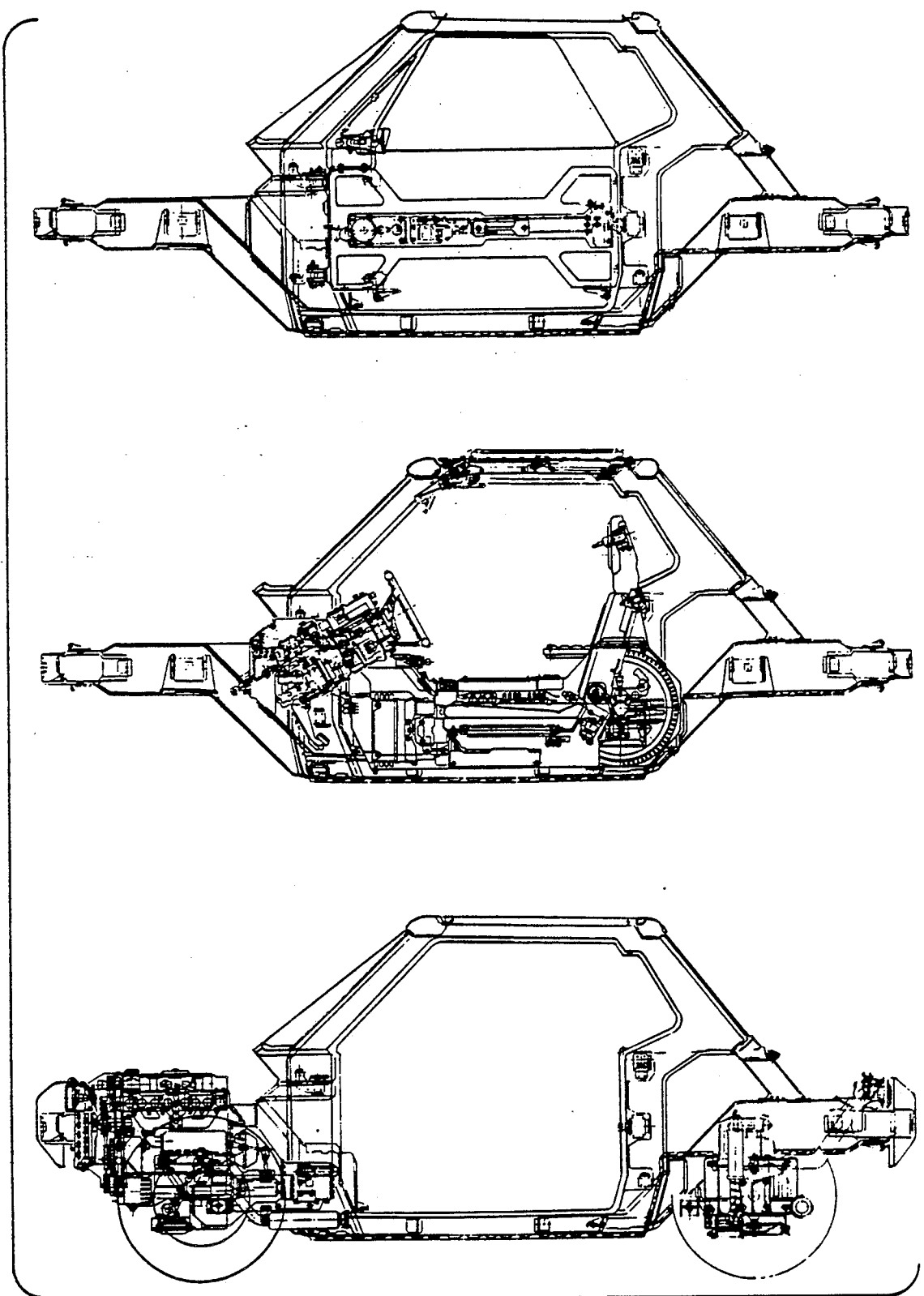
Figure 19:
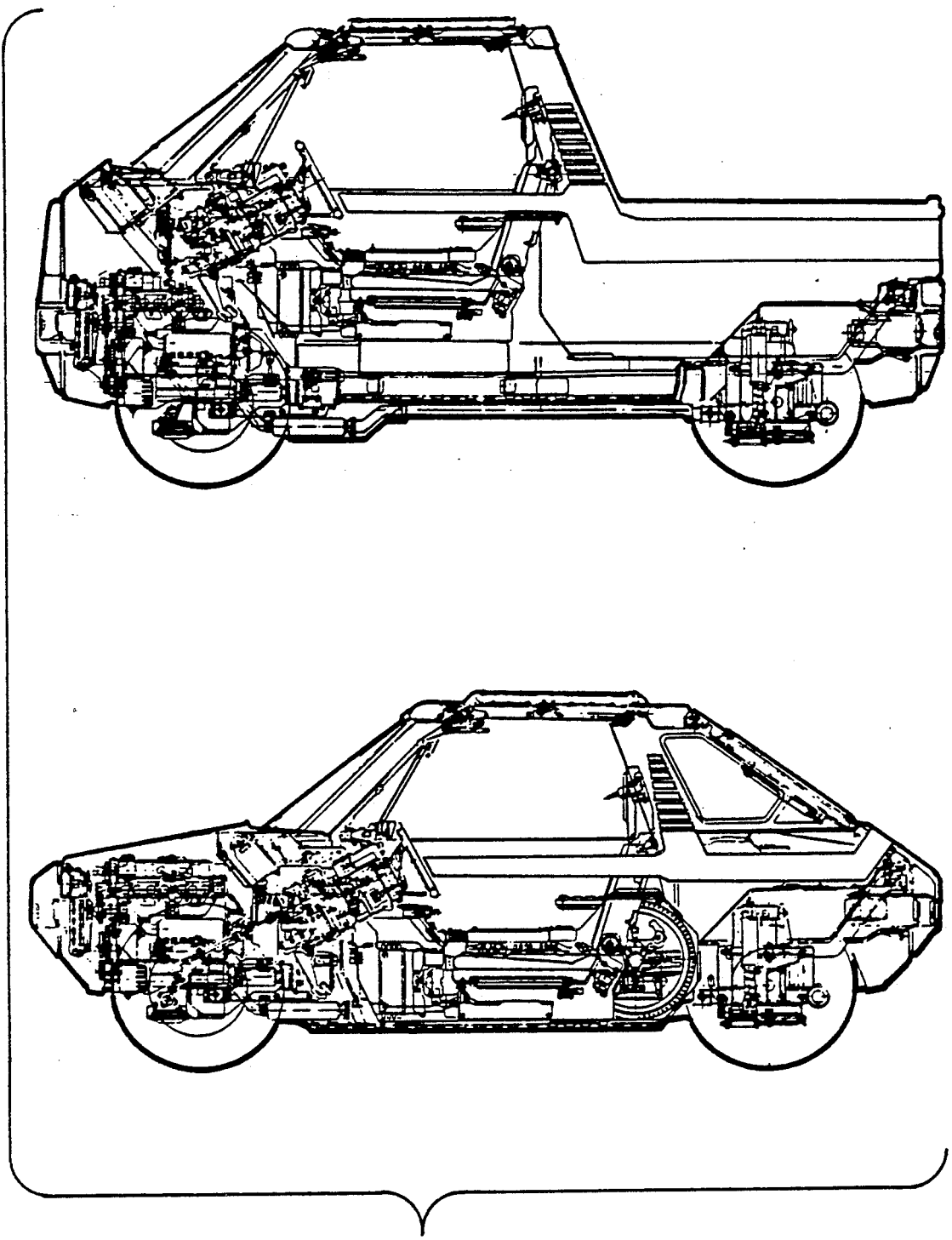
FIGS. 19 and 20 depict completed vehicles including a truck, van, and hatch back.
Figure 20:
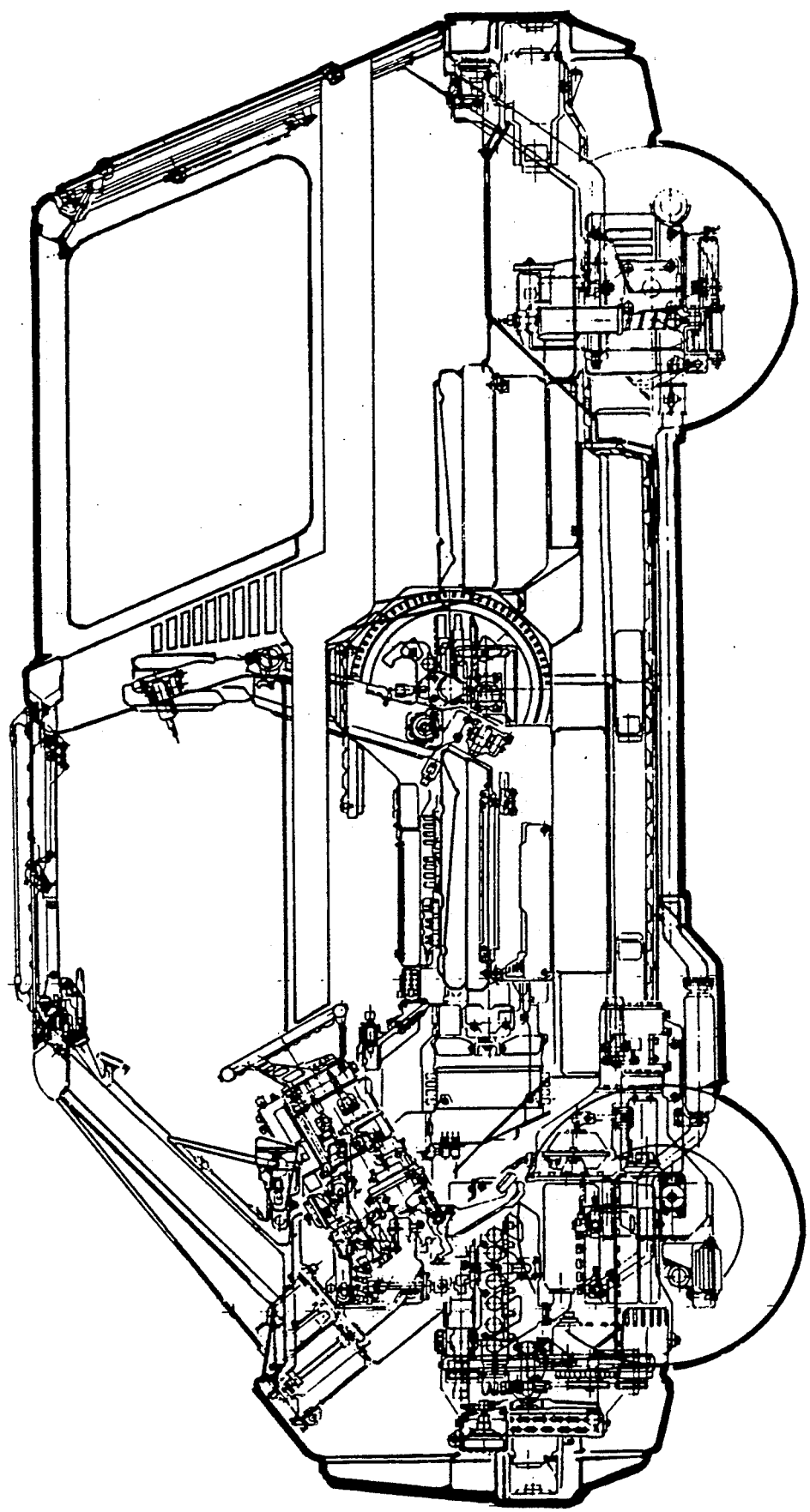

Arrangement of the 15 "ISS" units are shown in FIGS. 17, 18, 19, and 20. FIG. 17 is a plan view of various stages of vehicle studio assembly. FIG. 18 is a side elevation view of various stages of vehicle studio assembly. FIGS. 19 and 20 illustrate completed vehicles including a truck, van, and hatchback; all with parts interchanged with each other.

Description of Symmetry

An invention of Eli Whitney in 1799 included, for the first time, the three principles of Mass Production, Interchangeability, and Standardization. It is generally considered to be the greatest invention of all time because it makes all other inventions practical. The present invention adds a fourth principle known as Symmetry as it pertains to automobiles. Symmetry is not to be confused with Interchangeability. They are two entirely different principles. Current automobile production uses highly refined Interchangeability of parts. So refined in fact that the same jigs, fixtures, and tools can produce many different vehicles of many different styles even with one door on one side and two doors on the other side. Interchangeability still uses "mirror image" left hand and right hand parts. They are the same parts but of opposite hand which means they are actually two different parts. Symmetry eliminates mirror imaging, where possible, thereby making the parts identical. The benefits of Symmetry include less machinery, inventory, and parts, with lower costs.

Symmetry is the duplication of parts from one side of the vehicle to the other. Symmetry also exists between different vehicles for common part usage as in the case of the front and rear suspension wherein leaf springs are added or deleted to accomodate various loads. It is important to note that duplication from side to side does not affect styling because it is impossible to view or even photograph two opposite sides of a vehicle or one of its components at once. Some Symmetry does exist on current vehicle design such as the wheels. But it is of a very minor nature and obviously not obvious to those skilled in the art or else it would be used to greatly reduce costs. FIG. 2 illustrates Symmetry of the outer skins and facias wherein the left rear fender and wheel housing is the same as the right front one; the hood is the same as the deck lid; the right rear fender and wheel housing is the same as the left front one; both door skins are the same; and the front and rear facias are the same including 180 degree rotation if needed to vary styling effects.

FIG. 13 of the door assembly shows additional Symmetry between both left and right side door beams, side vents, side mirrors, inner panels, door mechanisms, and glass.

Figure 21:
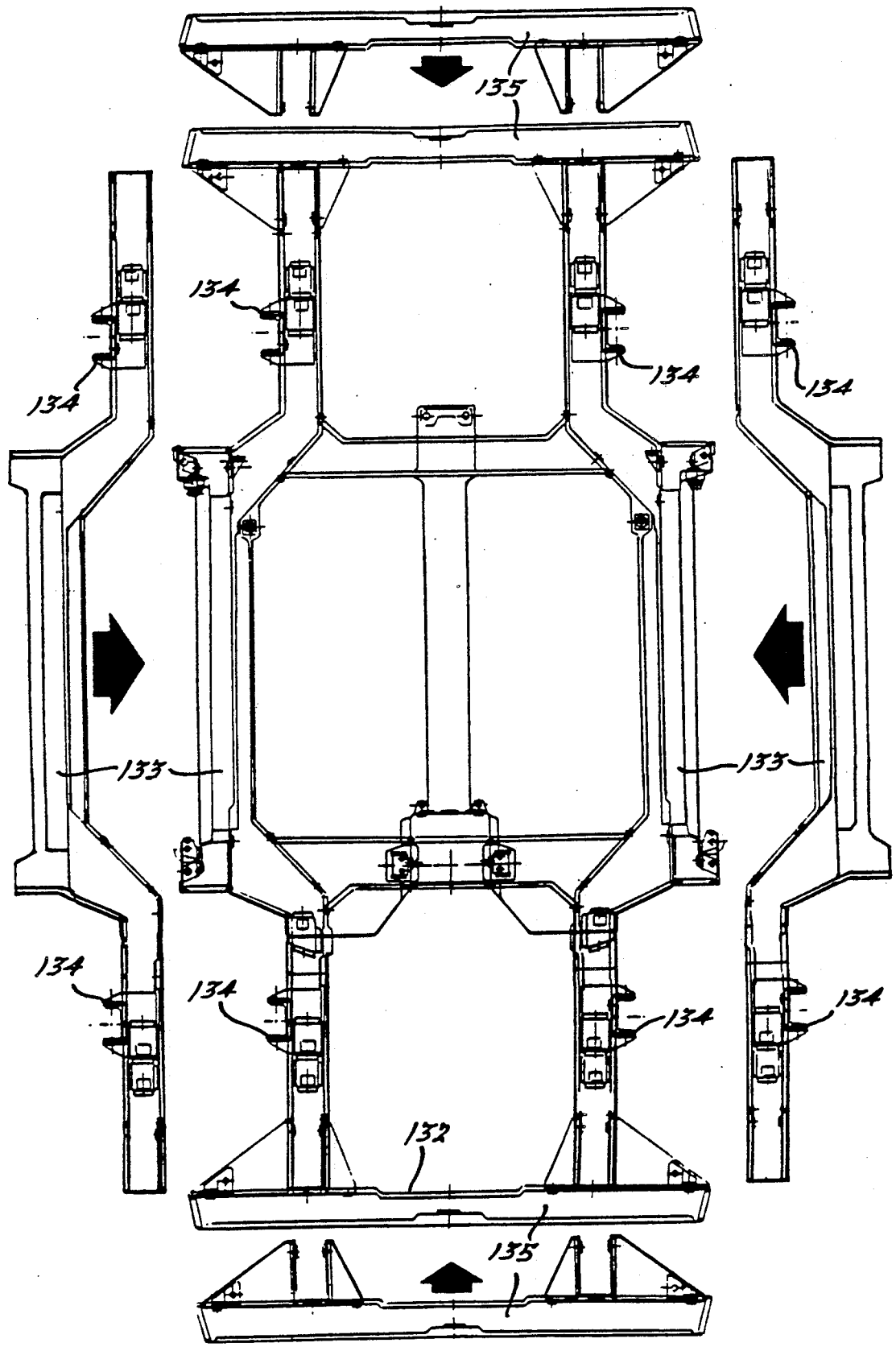
FIGS. 21 through 24 illustrate Symmetry features of the superstructure, power train, and truck box.

FIG. 21 illustrates a plan view of the superstructure space frame 132. The left rocker-engine-trunk structural member 133 is identical to that of the right side 133 including mounting brackets 134 for the power train and rear suspension. The front bumper structural member 135 is the same as the rear one 135.

FIG. 5 illustrates the Symmetry between seats including seat belt latching and retracting mechanisms.

Figure 22:
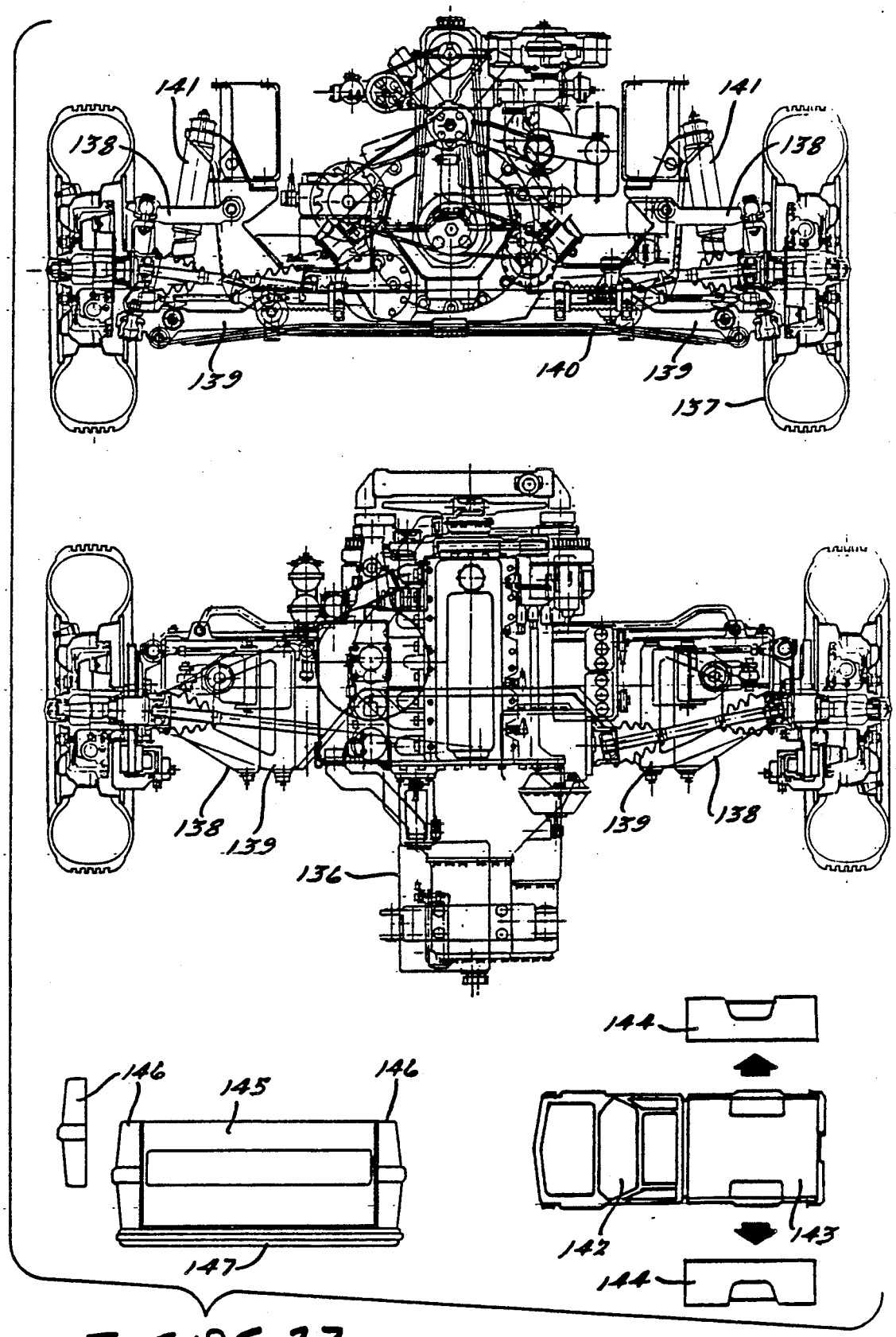

FIG. 22 illustrates power train plan view 136 and elevation view 137. The right upper control arm 138 is the same as the left one 138 including the ones on the rear suspension. The right lower control arm 139 is the same as the left one 139 including the ones on the rear suspension. The key to symmetrical front and rear suspensions are the transverse leaf springs 140 and constant spring rate loading to keep all four shock absorbers 141 the same. This is accomplished by adding or removing leaf springs to suit particular load conditions. This method of Symmetry is not possible with any other type of suspension such as coil or torsion springs since a hunk of such springs cannot easily be removed or added. This suspension design is also interchangeable with trucks, vans, and "ATV" (all terrain vehicles) with small load capacity and handle bar steering. The same shock absorber is used for all vehicles with no need to change its internal flow valve rate which is hermetically sealed. The same absorber can be used provided the same spring rate is maintained (lbs. per inch of deflection). This is accomplished by adding or removing springs. Additional variations besides leaf thickness and number of leafs can be obtained by variable leaf lengths. The friction between leafs acts as a further dampening effect for supporting excess load over design load (which other springs can't do) to enhance preformance of shock absorber and maintaining same spring rate. The load distributions for actual sizing of shock absorbers need only be approximately close to each other from vehicle to vehicle. Shock selection is always an average comprimise determined by actual vehicle read test for "best ride" due to varying loads such as full tank versus empty tank, 4 passengers versus 1 passenger, the different weight of passengers, full load versus empty load and so forth. Additional loads imposed by trailor or boat hitching can be accomodated by the addition of a rear spring or combinations with variable thickness leafs depending on the design to maintain the same spring rate hence the same absorbers. The basic formula for determining leaf spring deflections (cantilever loads) and spring rates can be found in any text book on "Strength of Materials".

Figure 23:
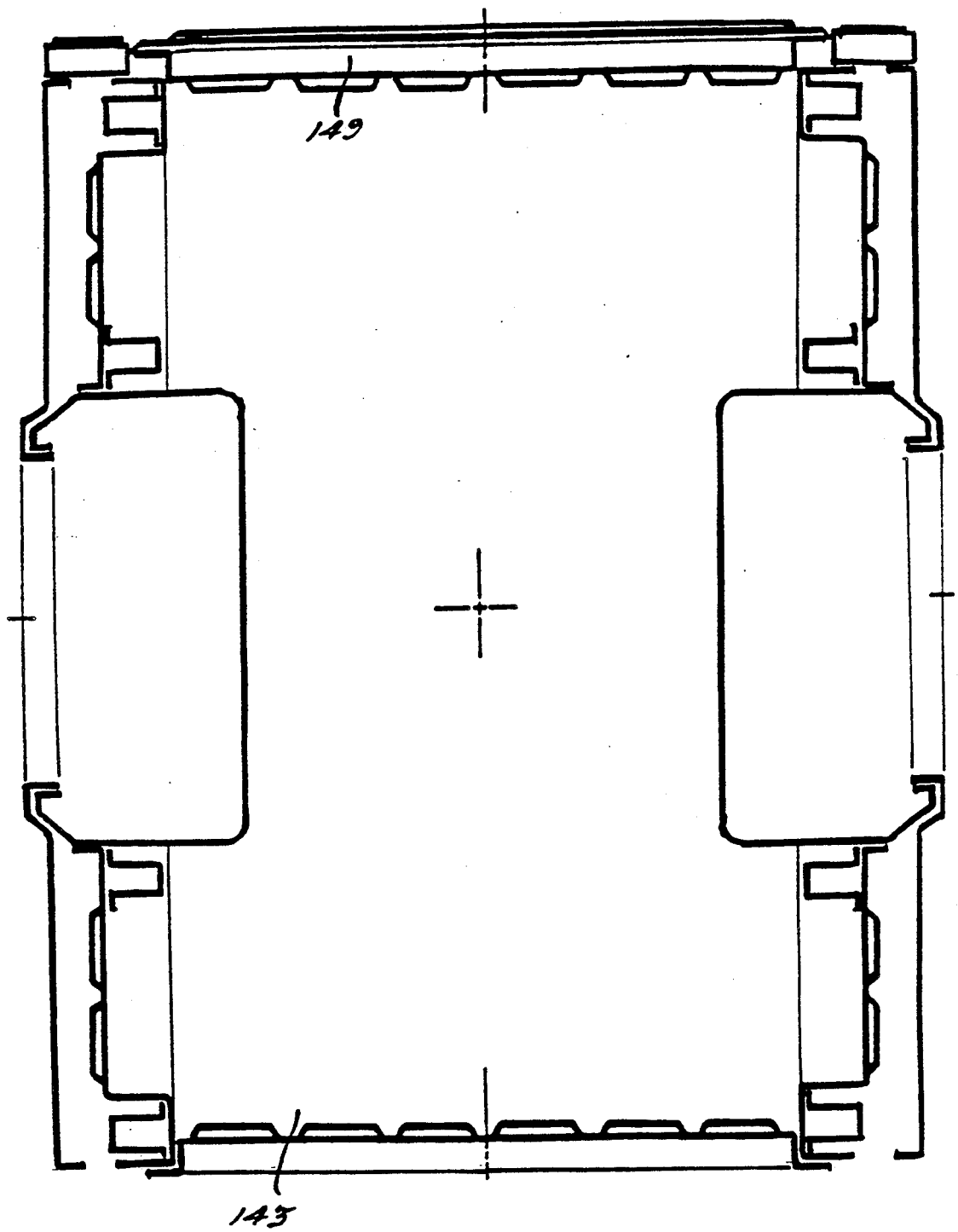
Figure 24:
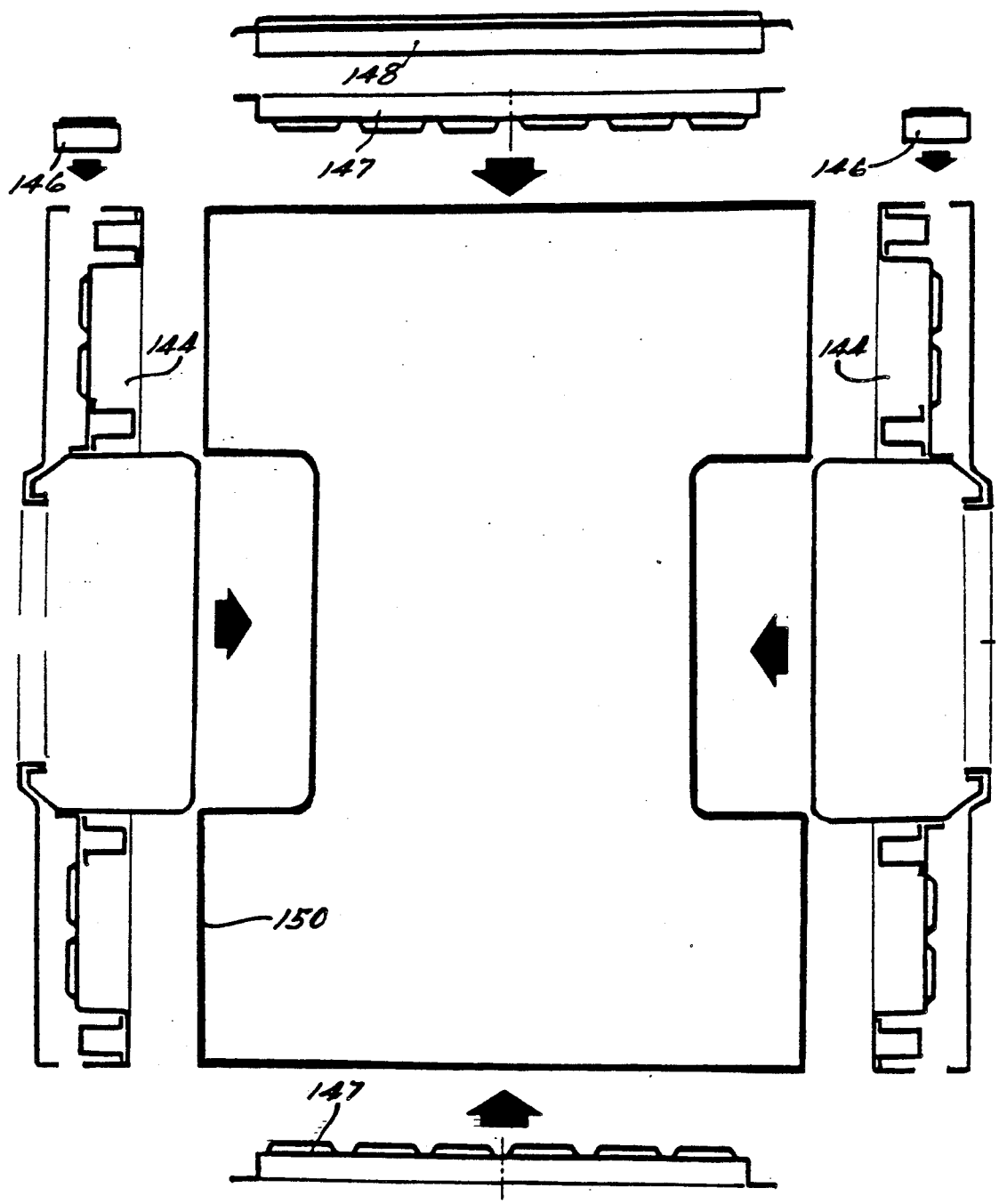

Truck box Symmetry is illustrated in FIG. 23. A truck 142 is shown in plan view with its box 143. Left and right box side members 144 are identical. The tail gate 145 and identical tail lights 146 rotated 180 degrees are shown in end view 147. FIG. 23 is an enlarged plan view of box 143. FIG. 24 with same components of FIG. 23 shows Symmetry between various components. The right box member 144 is also the left one 144. The left tail light 146 is also the right one 146. The front box closure 147 is identical to the rear box closure 147. Dress-up panel 148 is added to closure 147 to complete the tail gate assembly 149 shown in FIG. 23. Note that the box bed 150 is also symmetrical.

STYLING CONSIDERATIONS

Figure 25:
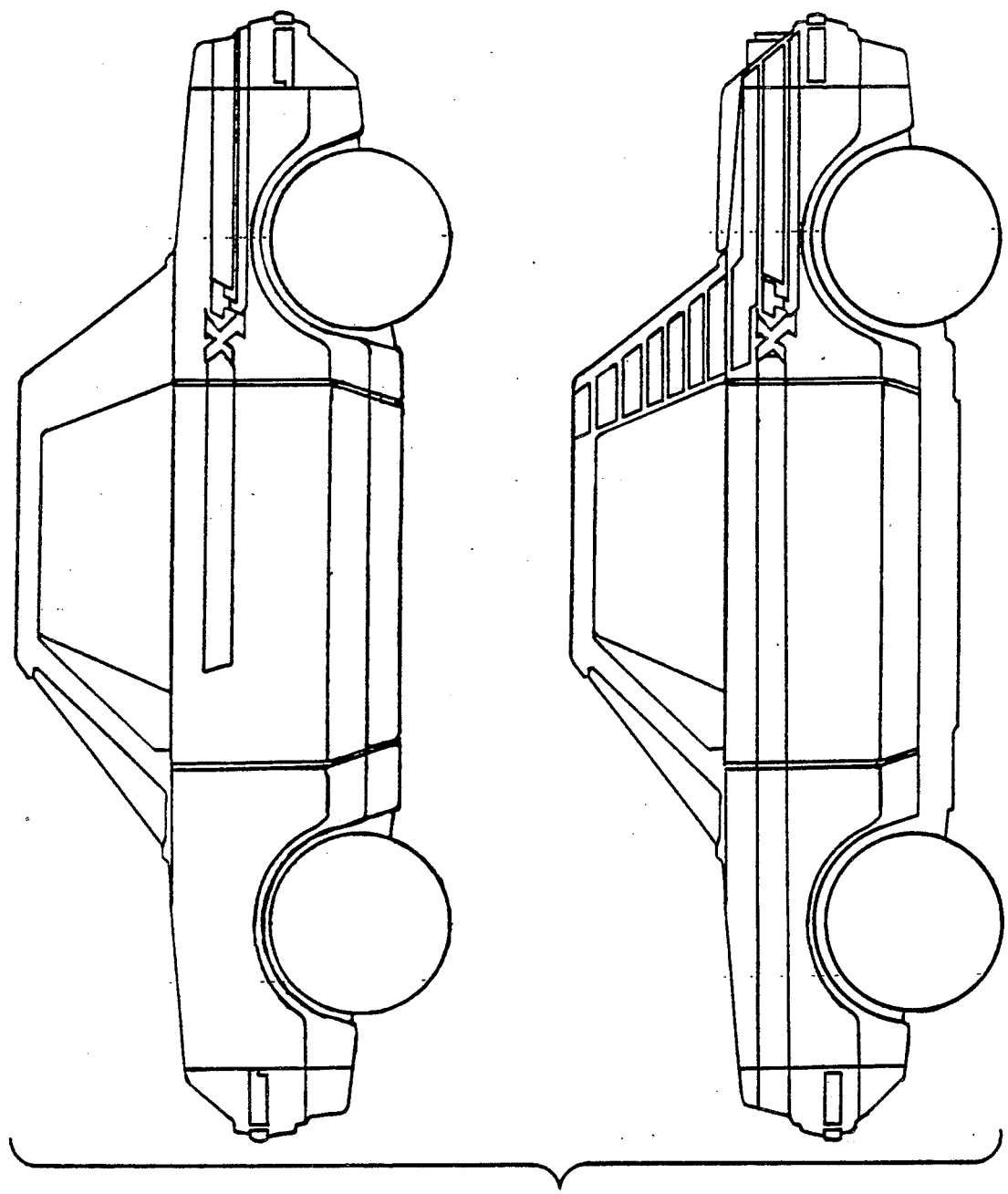
FIG. 25 illustrates different styling views using symetrical and identical parts for 2 different looking vehicles.

FIG. 25 illustrates two different styling views of the same vehicle composed of symmetrical outer skins. The facia panels 151 are identical but rotated 180 degrees for distinctively different front and rear styling lines. Additional examples of styling variations are add-on luggage rack 152, stripping 153, decals 154, and blackout paint 155.

Outer Skin Connections

Figure 26:
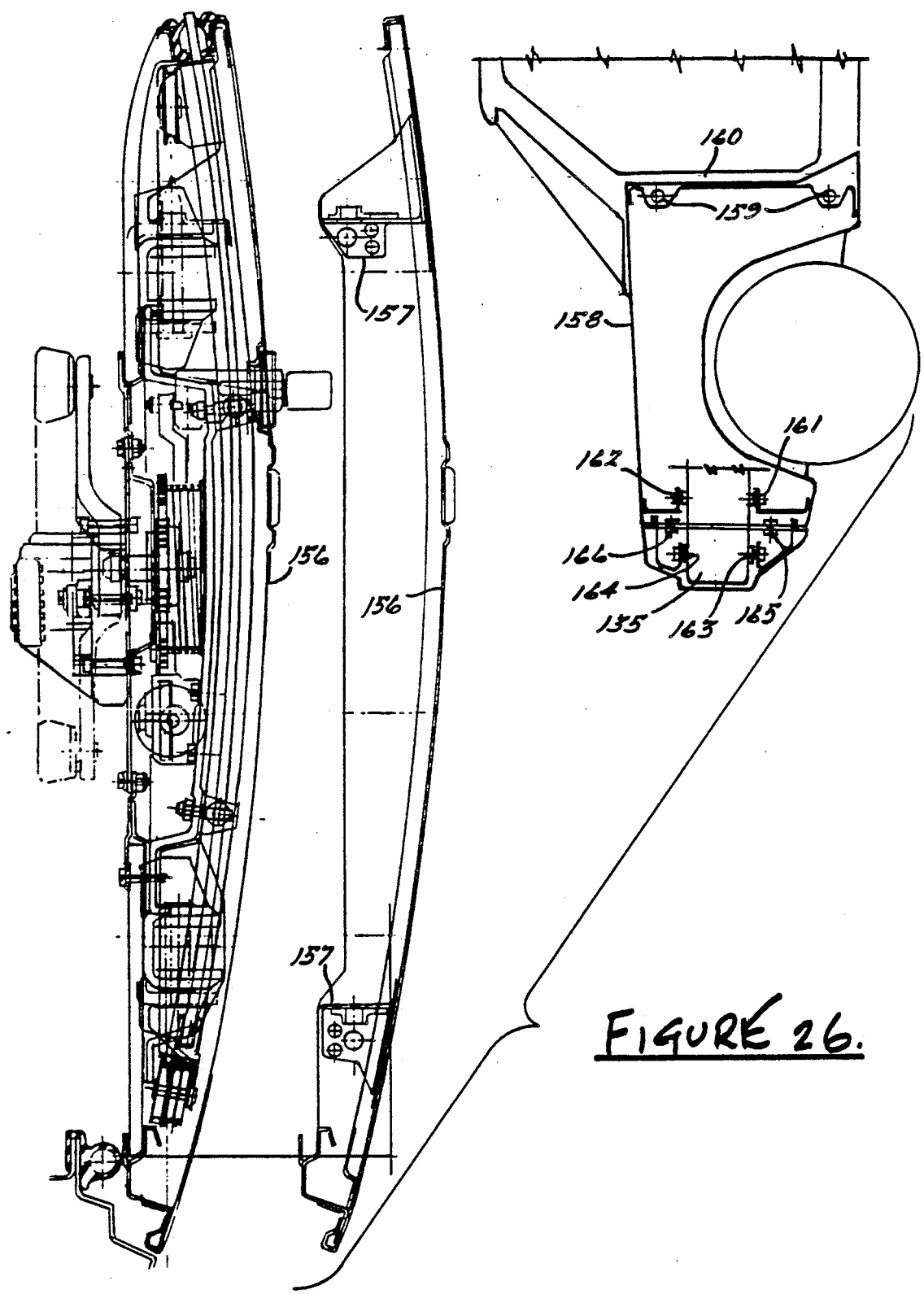
FIG. 26 shows bolt-on attachment details for outer skins.

Outer skin bolt-on connections are made to the superstructure, to "ISS" units, and to each other where possible. The front hood is shown in FIG. 15 connected in standard fashion to hood hinge 15. The rear deck lid is connected similarly to a deck hinge connected to the superstructure. The roof is connected to the superstructure as shown in FIG. 14 with four bolts 102. FIG. 26 illustrates door skin 156 and mounting holes 157 for bolt-on to the door beam. FIG. 25 also illustrates fender 158 bolt-on points 159 to superstructure post 160. The front end of the fender is shown connected to front bumper structural member 135 (from FIG. 21) at points 161 and 162. Front facia is connected to superstructure 135 at points 163 and 164. The facia is also connected to the fender at points 165 and 166 for maximum structural integrity.

Description of Remanufacturability The "Integrated Sub System" method of manufacturing automobiles allows for easy remanufacturibility of older, damaged, and rotted vehicles with easy part exchange, easy new additions, easy restyle, and a good warranty for used cars. There are many advocates of remanufacturability if only cars were made more serviceable.

Current rebuilding of parts include, among others, alternators, carbureators, master brake cylinders, starters, engines, and transmissions. The easy remanufacturability of entire vehicles with "ISS" units can now be added to the rebuild industry.

Figure 27:
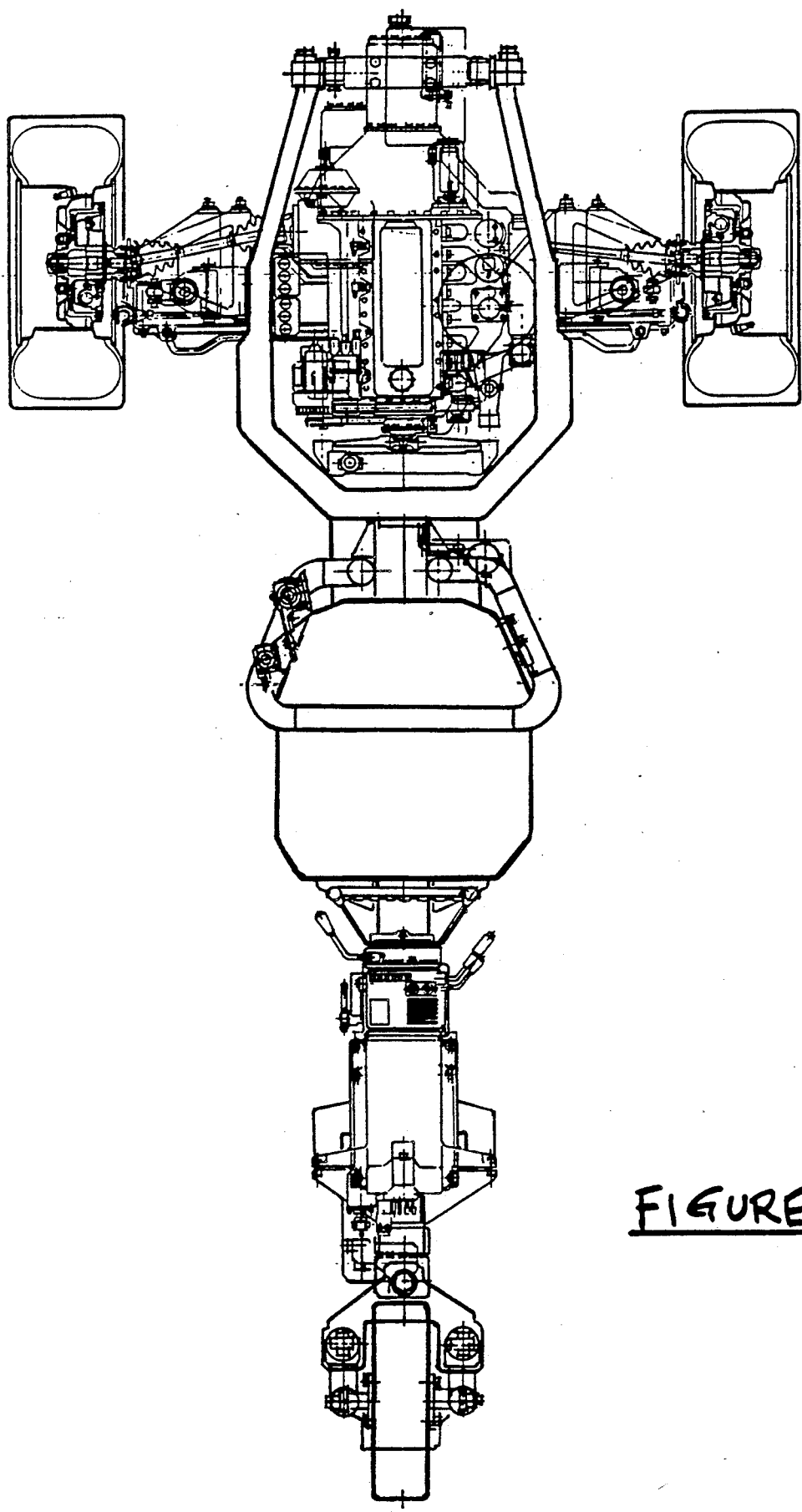
FIGS. 27 and 28 show remanufactured vehicles of a different type with new or rebuilt "ISS" components.
Figure 28:
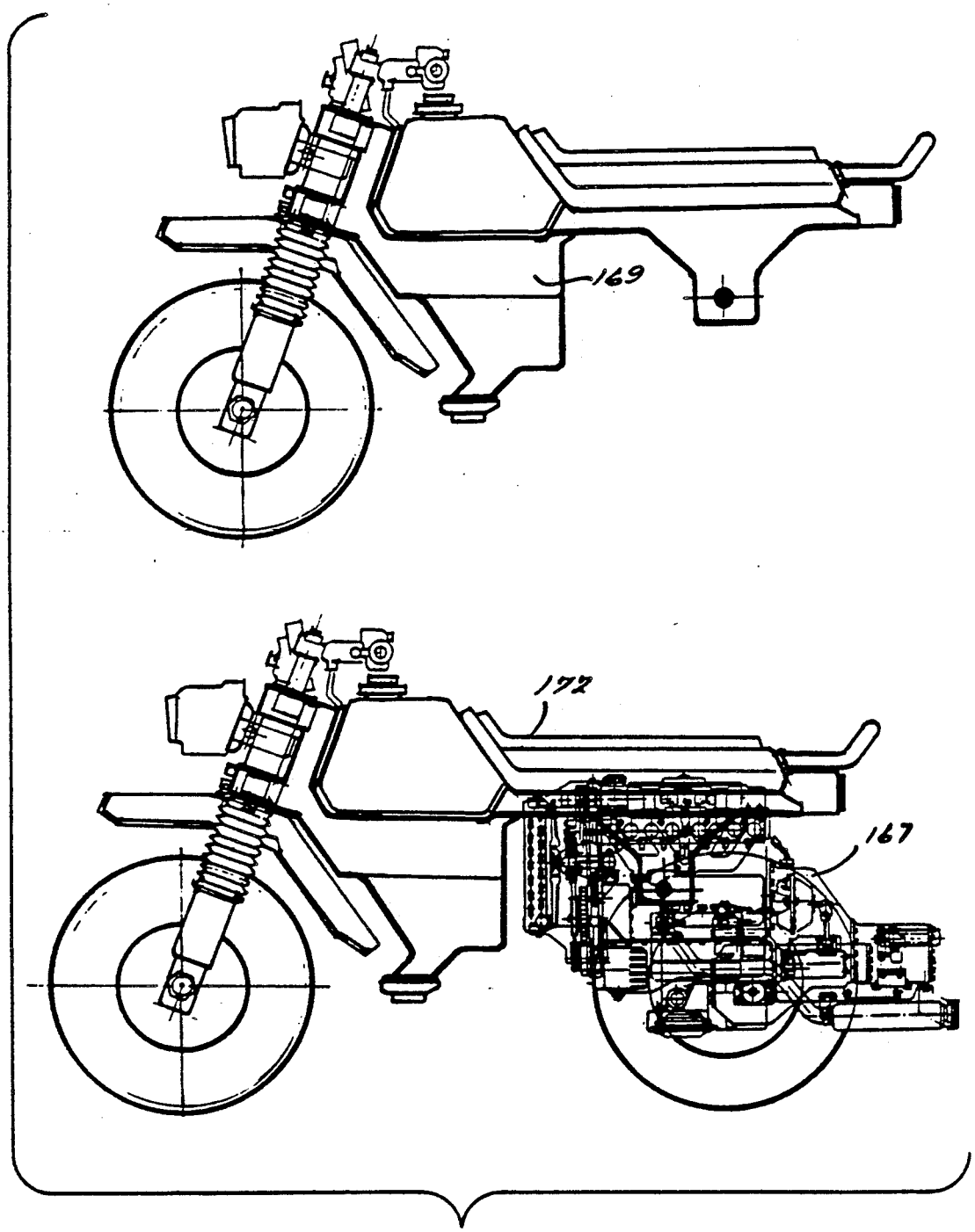

The ease of replacement and rebuilding of "ISS" units has the potential of opening up an entire new market of used car sales. The used car market in 1986 involved the sale of 18 million vehicles at an average price of almost $5,000 each. Most were sold without a warranty of any sort due to the great difficulty and high cost of rebuilding a vehicle which is in reality, one huge assembly. An additional benefit of remanufacturability is the ability of constructing other totally different vehicles. FIGS. 27 and 28 show an "ISS" powertrain 167 and an "ISS" steering console 168 that can be reused or can be new for incorporation into an inexpensive frame 169 and 170 to produce inexpensive off-the-road 3-wheel type vehicles 171 and 172. Steering is by the front wheel with powertrain steer mechanism locked in the proper position.

Description of Transfusion Coatings

The coating system used in the present invention consists of two parts: the standard process for outer skins and the "transfusion" process for the space frame which in reality is the superstructure holding the entire vehicle together. Outer skins which add beauty and styling are processed in standard automotive coating industry fashion on the inexpensive side so that they do not last too long. Their ease of replacement makes stamping production soar which in turn further reduces costs. That is a good feature because the automobile, like the human, can use a new set of clothes every so often. This becomes an easily implemented change with easy bolt-on construction of outer skins. This also enhances replacements of damaged parts when accidents occur.

There are many reasons "HOW" automobiles rust: They include among others galvanic action, concentration cell corrosion, reduction oxidation reactions from salt, sulphur diaxide, water, and acids, pearlite-ferrite electromotive potential, oxygen concentration imbalance, metallic disimilarization, and electrolytic reactions.

There is only one reason "WHY" automobiles rust: They are not properly protected with anti corrosion materials even though they have been around for years and are in current use in all automotive plants.

The inexpensive metal prep chemical process known as zinc phosphating with primer is very good at retarding corrosion of plain carbon sheet steel used in the manufacture of automobiles. The major drawback to all current systems is that metal prep is very difficult with dip and spray processes that do not properly prep interior and hidden surfaces such as rocker panels, pillar posts, engine horns, air plenums, dog legs, and so forth. Draw compounds, mil oils, and inhibitors are difficult to remove and their presence keeps primer coatings from adhering properly thereby accelerating degradation of the metal substrate.

Figure 29:
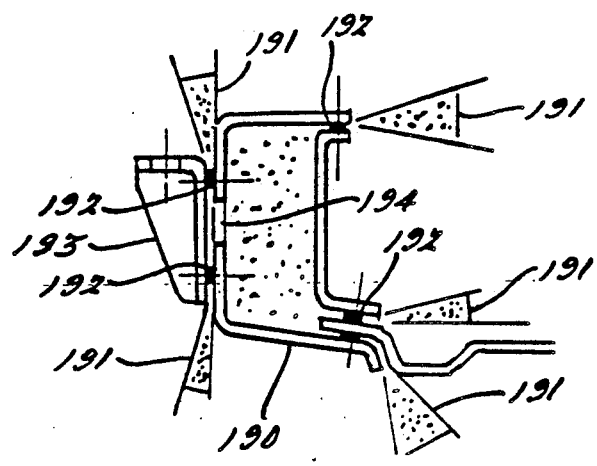
FIG. 29 illustrates the machine and methods for appling transfusion coatings to interior box sections for high corrosion protection.
Figure 29:
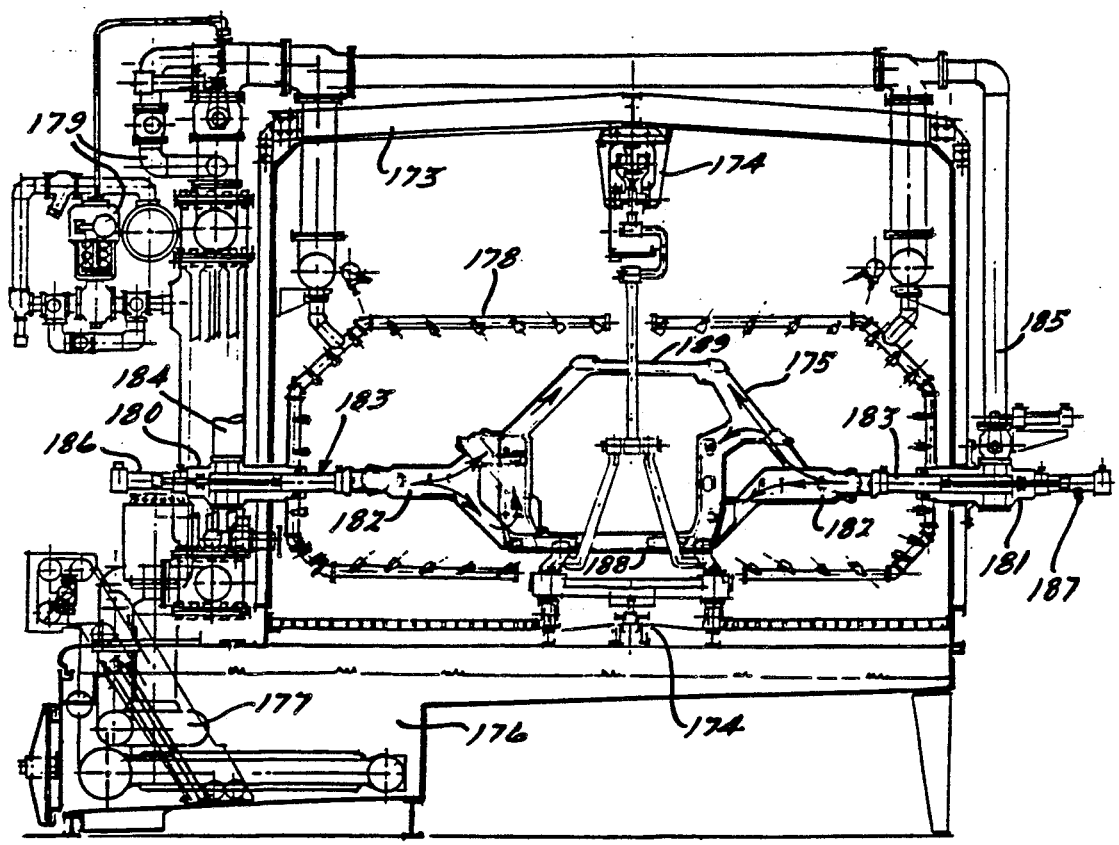

FIG. 29 illustrates the mode of operation of the present invention for metal preping a space frame type of vehicle which has throw away type outer skins. The machine housing 173 contains all the various chemical and primer stages. The conveyor 174 indexes the space frame 175 from stage to stage for processing in a stationary position. Support equipment is similar to that found in existing processes such as chemical and primer tank 176, main spray pump 177, exterior spray nozzles 178, and heating system 179. In addition, a dual power injector system 180 and 181 force feeds chemicals and primers through the interior box sections 182 of the space frame 175, hence the name "transfusion" coating. The injector 183 is tied into the main pumping system via headers 184 and 185. Pnumatic cylinders 186 and 187 connect the injector to feed holes in the front and rear of the space frame while it is in a stationary position. The entire space frame consists of box sections interconnected for easy flow. Drainage is accomplished by gravity and compressed air blow out from injectors. Drainage is via a hole in each rocker panel 188 and, if necessary, via a hole in each roof rail 189.

FIG. 29 also illustrates an enlarged view of a rocker panel 190 typical of box sections found on the space frame. Pressurized chemicals and primers can ooze out of the box section as shown at 191. This insures the preping even of interior spot welded joints 192. In addition, a typical bracket 193 shows how it also gets an interior preping via fluid that oozes out through feeder hole 194 and thence to the back of the bracket.

Description of the Automatic Transport Mode

Figure 30:
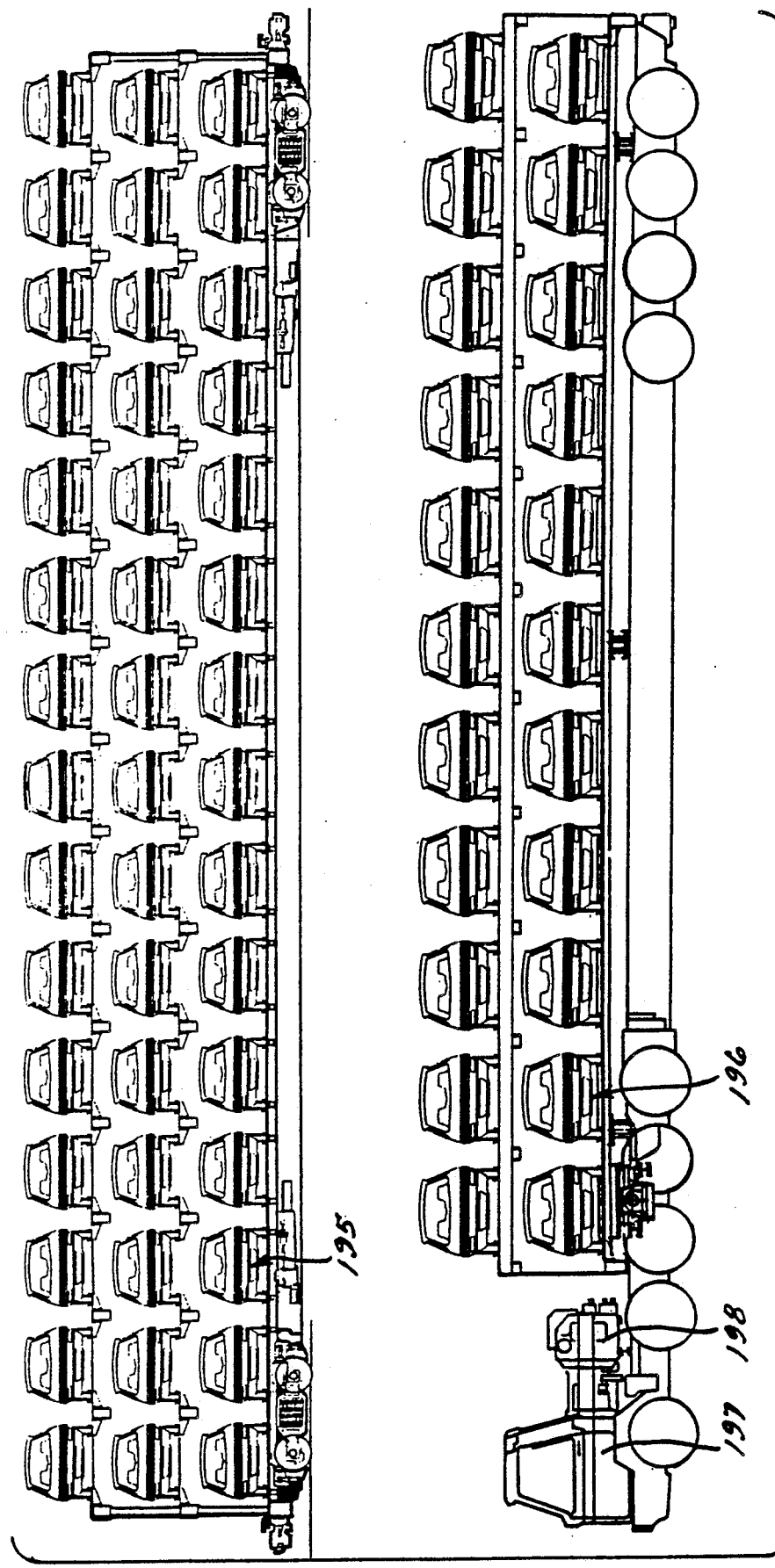
FIGS. 30 through 34 illustrates different views of the Automatic Transport Mode.

The Automatic Transport Mode is a new type of mass transit and is shown in FIG. 30 with 45 vehicles loaded on a railroad car 195 and 22 vehicles loaded on a transporter truck 196 for highway use. The truck cab 197 contains an electric generator 198 which will be subsequently described. The railroad car would have a similar generator built-in or located on the locomotive pulling the car. The Automatic Transport Mode allows the driver to remain in the vehicle and enjoy leisure time without running the engine. This method of transportation would help eliminate some of the tedious burdens of driving. It would enhance mass transit because the energy required for railway usage is approximately 320 BTU per ton-mile as compared to 7,600 for passenger cars. Travelers costs would be lowered even further because night sleeping and traveling runs concurrently. Accidents would be lowered. There are many other advantages apparent, such as non sequential loading and unloading as required for random access.

Travel time with high speed trains running at 150 miles per hour would be lower with short run trips as compared to planes. With the present invention there is no time wasted with travel to and from remote airports, parking, walking, checking in, waiting and so forth. For example, a trip of 300 miles between Detroit and Chicago would take only two hours. The replacement of small load and unload structures could be very conveniently located on spurs or off-roads almost anywhere.

Figure 31:
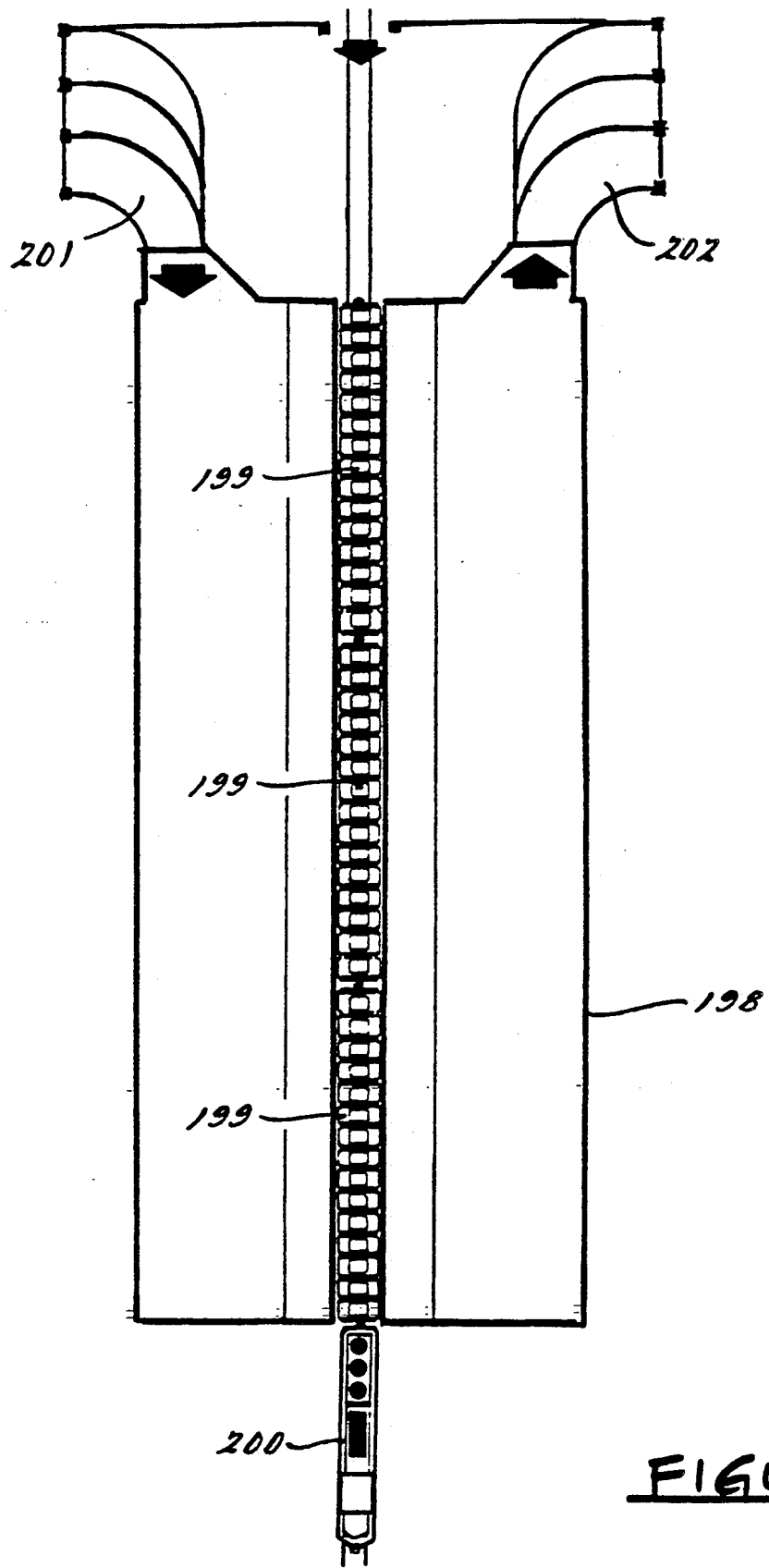

FIG. 31 illustrates a plan view of a loading and unloading structure 198 approximately 280 feet long and 120 feet wide. This would accomodate 3 railroad cars 199 carring a total of 285 vehicles and pulled by locomotive 200. Load 201 and unload 202 ramps could handle 570 vehicles at once. Similar facilities, both larger and/or smaller would apply to transport truck conveying.

Figure 32:
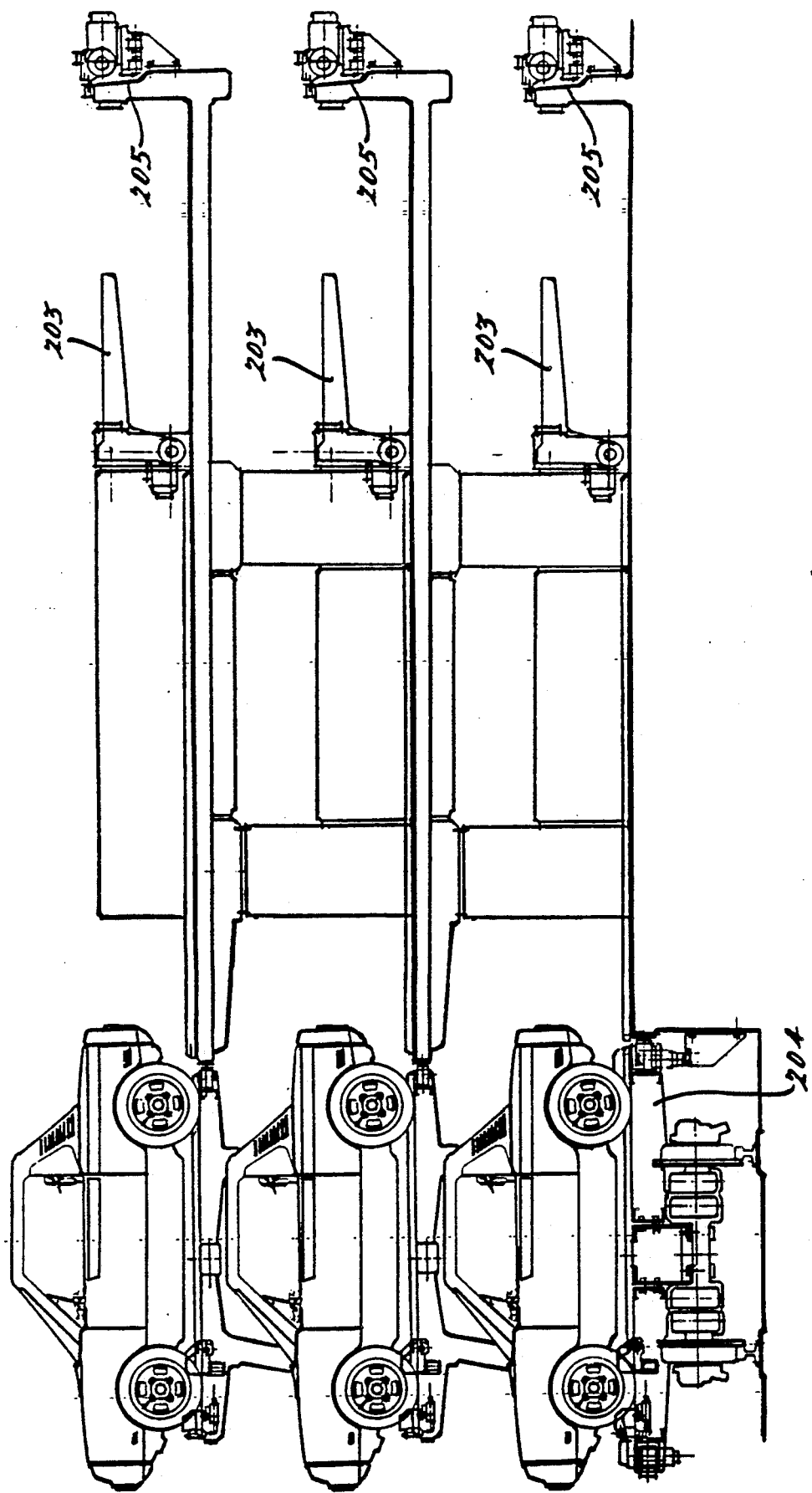

FIG. 32 illustrates a cross section through a 3 level load and unload structure. Automatic gates 203 prevent vehicles from entering load positions until rail car 204 is in position. Movable winches with cables 205 are used to extract stalled vehicles.

Figure 33:
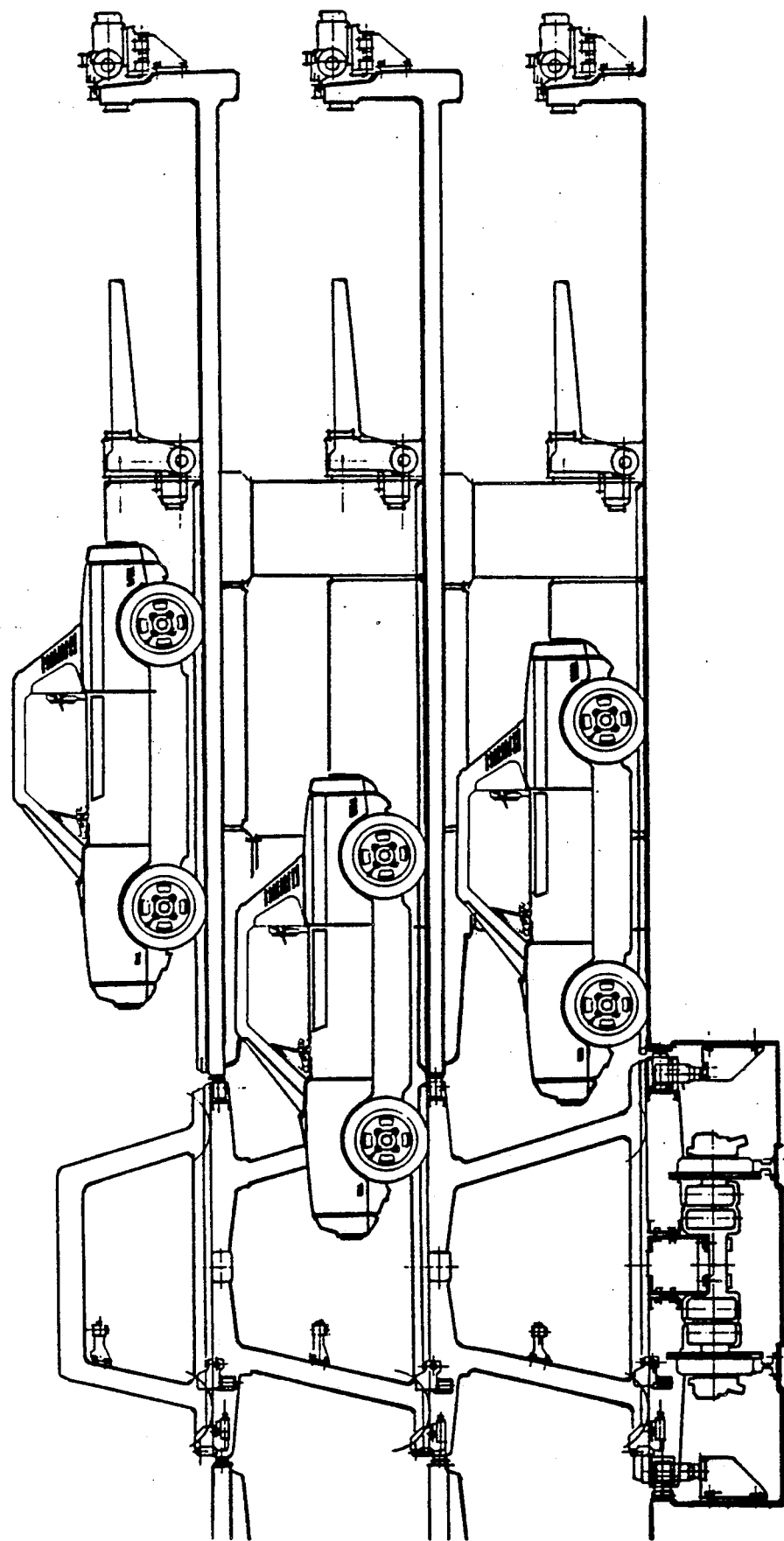

FIG. 33 illustrates vehicles in various positions prior to loading onto the rail car.

Figure 34:
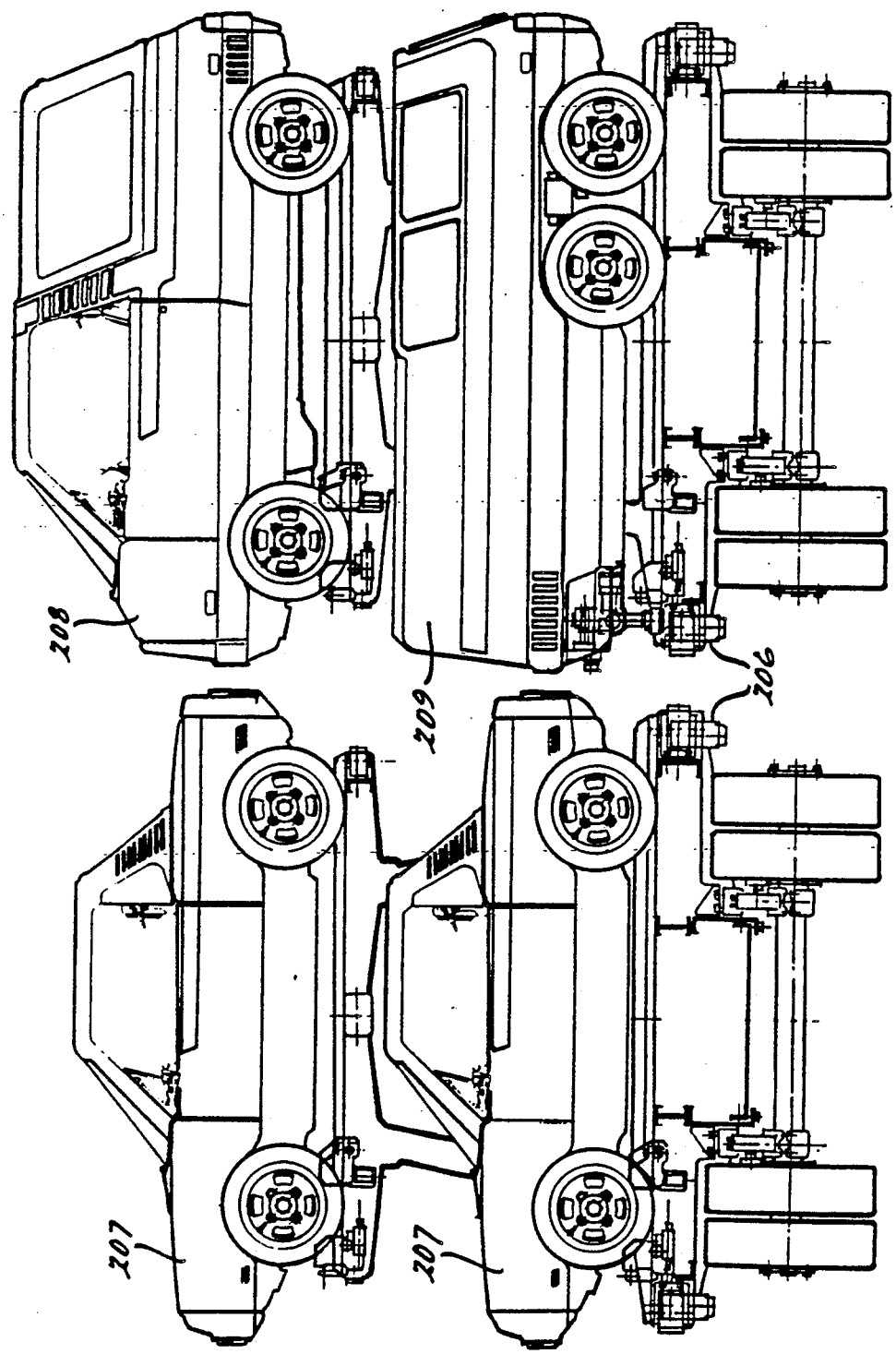

FIG. 34 illustrates various vehicles on transport trucks 206. Vehicles include a car 207, a van 208, and a trailer 209. The trailer 209 illustrates how the present invention could be used for material and goods transportation without sequential loading and unloading for random access anywhere along the route.

Figure 35:
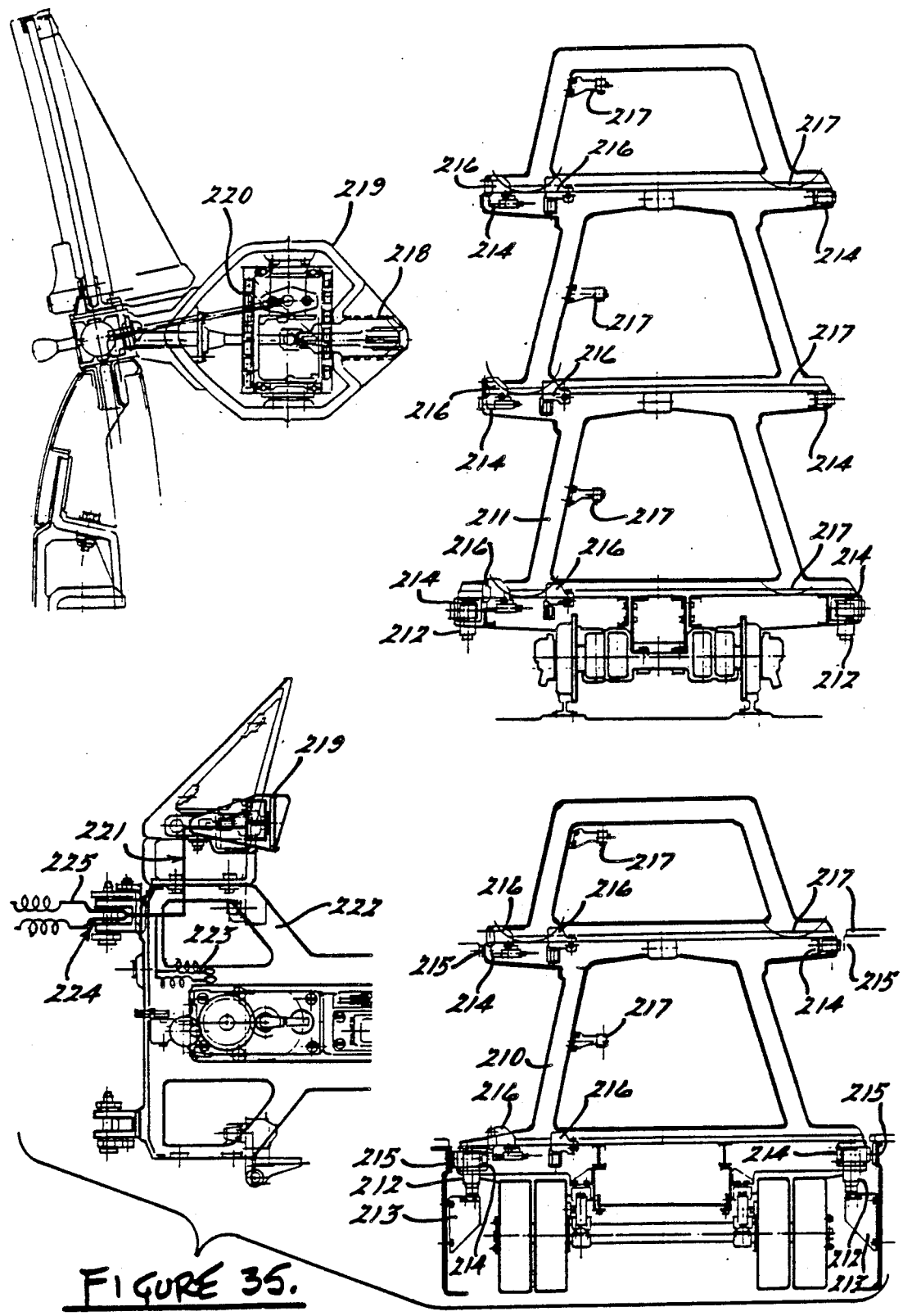
FIG. 35 illustrates stabilization, locking, and electrification required for the Automatic Transport Mode.

FIG. 35 illustrates an end view through an empty transport truck 210 and an empty railroad car 211. Stabilization at load and unload points is by means of hydraulic levelers 212 built into the transporters. They brace the transports from tilting by contact with structural plate 213 thereby keeping everything level. Horizontal positioning is enhanced by rollers 214 that rub against wear plates 215 on the main structure. Vehicle wheels are locked without shackles by automatic locking chocks 216 that are controlled by the "conductor" or transport "driver" at load and unload times. Correct alignment of a vehicle is maintained by wheel guides 217. Power to run the vehicles air conditioning, heater, and radio systems comes from electric generators on the railroad car and transport truck. Power outlets 217 are tapped by plug 218 located in the side view mirror 219 or other appropriate place. Power outlets 217 can also be installed in parking meters and home garages for electronic pre programing of vehicle functions such as heating and defrosting during cold weather while the owner sleeps. Retractor 220 prevents the vehicle from being started unless plug 218 is fully retracted. Power cable 221 from retractor 220 is shown threaded through the door beam 222 to power door mechanisms 223 and to hinge rotary brush 224 and thence inboard 225 to the appropriate hookup point in the vehicle. The retractor 220 for the wire to plug 218 is of standard design with slip brushes to convey electricity. Rotary brush 224 is similar. In other words 220 and 224 are electrical swivel joints.

The vehicle length for use in the Automatic Transport Mode is 128 inches or more. This is satisfied by vehicle design of the present invention as well as many other vehicles currently on the market with similar lengths.

ALTERNATIVE EMBODIMENTS

It should be apparent from the forgoing description of various embodiments of automobiles and their components formed in accordance with the principles of the present invention that the invention provides features of construction simplicity and manufacturing capability having substantial potential advantages in reduction of cost over more conventional configurations. Further it should be recognized that the numerous features of the invention, as disclosed in the described embodiments, could be applied to other vehicle configurations and components and that numerous changes could be made in the described embodiments without departing from the spirit and scope of the inventive concepts described. Accordingly, it is intended that the invention not be limited to the described embodiment but that it have the full scope permitted by the following claims.

What is claimed is:

1. A method of assembling an automotive vehicle in an essentially stationary position, comprising the steps:
   providing a superstructure frame having a limited number of predetermined mounting locations;
   providing a predetermined number of integrated sub-systems which each represent self-contained grouped units of combined vehicle components capable of being interchanged with integrated sub-systems of the same type to enable different vehicle styles to be produced from he same superstructure frame and to permit selective replacement of any of said integrated sub-systems subsequent to manufacture of said vehicle, each of said integrated sub-systems having corresponding mounting locations to said mounting location on said superstructure frame; and
   mounting each of said integrated sub-systems to said superstructure frame at said mounting locations, such that said vehicle is substantially entirely comprised of said superstructure frame and said integrated sub-systems.

2. The method according to claim 1, wherein said integrated sub-systems are removably mounted to said superstructure frame, such that any and all of said integrated sub-systems may be removed and replaced without replacing any of the other of said integrated sub-systems.

3. The method according to claim 1, wherein at least some corresponding pairs of said vehicle components on different sides of said vehicle are identical, including a front wheel facia with a rear wheel facia.

4. The method according to claim 3, wherein at least one of said corresponding pairs has a vehicle component which is rotated approximately 180 degrees relative to the other of said vehicle component in said corresponding pair.

5. A superstructure frame for an automotive vehicle having a plurality of interconnected structural members in the form of box sections, and means associated with said structural members for removably mounting a predetermined number of self-contained integrated sub-system units of grouped vehicle components to said superstructure frame which together provide substantially all of the components for said vehicle.

6. The superstructure frame according to claim 5, wherein said box sections which are interconnected to enable a rust inhibitor to be injected through said superstructure frame, there being at least one injection opening and at least one ejection opening in said superstructure frame to permit flow of said rust inhibitor through said superstructure frame.

7. The superstructure frame according to claim 6, wherein said plurality of interconnected structural members includes a pair of substantially identical front and rear bumper structural members, and a pair of substantially identical rocker-engine-trunk structural members.

8. An automotive vehicle, comprising:
   a superstructure frame constructed to receive substantially all components for said vehicle as individual self-contained integrated sub-system units, said integrated sub-system units being removably mounted to said superstructure frame, and at least some of integrated sub-system units being separately tested before mounting to said frame, said integrated sub-system units including a fully operable power train unit having an engine, a transmission, a front suspension, and cooling apparatus.

9. An adaptable automotive vehicle, comprising:
a superstructure frame which supports a set of integrated sub-system units at predetermined mounting locations on said superstructure frame, each of said integrated sub-system units represent self-contained grouped units of combined vehicle components which permit said integrated sub-system units to be interchanged with different integrated sub-system unit of the same type to create different vehicle designs without having to vary the design of other integrated sub-system units.

10. The automotive vehicle according to claim 9, wherein said individual integrated sub-system units include:
a power train and first suspension unit;
a second suspension unit;
an air conditioning and heating unit;
a steering wheel and control unit;
a center console and seat unit;
a roof unit;
an air plenum unit;
front and rear facia units;
a pair of door units; and
an outer panel unit.

11. The automotive vehicle according to claim 10, wherein at least one of said suspension units includes a removably attached fixture containing a wheel for providing stability for said unit during assembly of said vehicle.

12. The automotive vehicle according to claim 9, wherein at least some of said front and rear facia units are symmetrical in that they include identical components on opposite sides of said vehicle, including a front wheel facia with a rear wheel facia.

13. The automotive vehicle according to claim 9, wherein said integrated sub-system units provide at least one seat for said vehicle and a steering wheel for said vehicle, the position of said seat being fixed in said vehicle and the position of said steering wheel being movable toward or away from the position of said seat.

14. The automotive vehicle according to claim 13, wherein said steering wheel is part of an integrated sub-system unit which contains control pedals for said vehicle, and said control pedals move with telescoping movement of said steering wheel.

15. A method of remanufacturing a vehicle, comprising the steps of:
assembling a vehicle by removably mounting individual self-contained integrated sub-system units to a superstructure frame, said sub-system units including a power train and suspension unit, a steering wheel and control unit, and a center console and seat unit; and
subsequently removing and replacing one of said sub-system units with another unit of the same type, but having a different design, without requiring the replacement of any other of said sub-system units.

16. The method according to claim 15, wherein said sub-system unit replaced is either said power train and suspension unit, said steering wheel and control unit, or said center console and seat unit.

* * * * *

UNITED STATES PATENT AND TRADEMARK OFFICE
CERTIFICATE OF CORRECTION

PATENT NO. : 5,002,309
DATED : March 26, 1991
INVENTOR(S) : Anthony M. Vecellio It is certified that error appears in the above-identified patent and that said Letters Patent is hereby corrected as shown below:

Column 1, line 20, "symetrical" should be --symmetrical--;

Column 1, lines 26-27, "appling" should be --applying--;

Column 1, line 68, "existance" should be --existence--;

Column 2, line 7, "enity" should be --entity--;

Column 2, line 25, "Intergrated" should be --Integrated--;

Column 2, line 29, "discarging" should be --discarding--;

Column 2, line 52, "principal" should be --principle--;

Column 3, line 5, delete "30";

Column 3, line 19, "accomodate" should be --accommodate--;

Column 5, line 43, "sepatate" should be --separate--;

Column 5, line 58, "accomodate" should be --accommodate--;

Column 6, line 6, "cannister" should be --canister--;

Column 7, line 34, "accomodate" should be --accommodate--;

Column 8, line 24, "comprimise" should be --compromise--;

UNITED STATES PATENT AND TRADEMARK OFFICE
CERTIFICATE OF CORRECTION

PATENT NO. : 5,002,309
DATED     : March 26, 1991
INVENTOR(S) : Anthony M. Vecellio It is certified that error appears in the above-identified patent and that said Letters Patent is hereby corrected as shown below:

Column 8, line 24, "read" should be --road--;

Column 8, line 28, "trailor" should be --trailer--;

Column 9, line 11, "remanufacturibility" should be --remanufacturability--;

Column 9, line 17, "carbureators" should be --carburetors--;

Column 9, line 57, "diaxide" should be --dioxide--;

Column 10, line 10, "preping" should be --prepping--;

Column 10, line 23, "pnumatic" should be --pneumatic--;

Column 10, line 35, "preping" should be --prepping--;

Column 10, line 37, "preping" should be --prepping--;

Column 11, line 3, "accomodate" should be --accommodate--;

Column 11, line 4, "carring" should be --carrying--;

UNITED STATES PATENT AND TRADEMARK OFFICE
CERTIFICATE OF CORRECTION

PATENT NO. : 5,002,309

DATED : March 26, 1991

INVENTOR(S) : Anthony M. Vecellio

It is certified that error appears in the above-identified patent and that said Letters Patent is hereby corrected as shown below:

Column 11, line 40, "programing" should be --programming--;

Column 11, line 59, "forgoing" should be --foregoing--;

Column 12, line 17, Claim 1, "he" should be --the--.

Signed and Sealed this

Twentieth Day of October, 1992

*Attest:*

DOUGLAS B. COMER

*Attesting Officer*  *Acting Commissioner of Patents and Trademarks*